United States Patent
Senibi et al.

(10) Patent No.: US 9,194,769 B1
(45) Date of Patent: Nov. 24, 2015

(54) SYSTEMS AND METHODS FOR ENVIRONMENTAL TESTING AND EVALUATION OF NON-DESTRUCTIVE INSPECTION SENSORS

(71) Applicant: The Boeing Company, Chicago, IL (US)

(72) Inventors: Simon D. Senibi, Covington, WA (US); Jeffrey M. Hansen, Renton, WA (US)

(73) Assignee: The Boeing Company, Chicago, IL (US)

( * ) Notice: Subject to any disclaimer, the term of this patent is extended or adjusted under 35 U.S.C. 154(b) by 498 days.

(21) Appl. No.: 13/748,575

(22) Filed: Jan. 23, 2013

(51) Int. Cl.
- *G06F 11/00* (2006.01)
- *G01M 99/00* (2011.01)
- *G01M 17/00* (2006.01)
- *G06F 17/00* (2006.01)

(52) U.S. Cl.
CPC .............. *G01M 99/00* (2013.01); *G01M 17/00* (2013.01); *G06F 17/00* (2013.01)

(58) Field of Classification Search
CPC ...... B29C 33/3842; B29C 33/42; B29C 39/34
USPC .................................. 702/116–118, 182–185
See application file for complete search history.

(56) References Cited

U.S. PATENT DOCUMENTS

| 7,333,898 | B2 | 2/2008 | Griess et al. |
| 7,426,447 | B2 | 9/2008 | Pado |
| 7,665,362 | B2* | 2/2010 | Sadri .............................. 73/597 |
| 7,705,725 | B2 | 4/2010 | Matsen et al. |
| 2009/0133381 | A1* | 5/2009 | Holmes et al. .................. 60/204 |
| 2012/0152007 | A1* | 6/2012 | Holmes et al. ............. 73/112.01 |

* cited by examiner

*Primary Examiner* — Edward Raymond

(57) ABSTRACT

A system and method for environmental testing and evaluation of non-destructive inspection (NDI) sensors is provided. The system has a structure having a plurality of NDI sensors to be tested. The system further has an environmental chamber containing heating elements and cooling elements for heating and cooling the NDI sensors when the structure is secured to the environmental chamber. The system further has an impact testing assembly positioned over the structure for impacting the structure. The system further has a data acquisition computer subsystem coupled to the environmental chamber and coupled to the NDI sensors. The data acquisition computer subsystem controls and monitors the heating and cooling elements, and collects and processes temperature and impact data acquired by the NDI sensors.

20 Claims, 11 Drawing Sheets

SYSTEMS AND METHODS FOR ENVIRONMENTAL TESTING AND EVALUATION OF NON-DESTRUCTIVE INSPECTION SENSORS

BACKGROUND

1) Field of the Disclosure

The disclosure relates generally to systems and methods for testing and evaluation of sensors, and more specifically, to systems and methods for environmental testing and evaluation of non-destructive inspection (NDI) sensors.

2) Description of Related Art

Non-destructive inspection (NDI) involves inspecting and evaluating a structure without damaging the structure or requiring its significant disassembly, and without impairing the structure's future use and serviceability. NDI is advantageous for many applications in which a thorough inspection of the exterior and/or interior of a structure is required. For example, NDI is typically used in the aircraft industry to inspect aircraft structures during manufacturing of the structures and/or once the structures are in-service.

Various types of sensors may be used to perform NDI. Known sensor systems and methods for NDI exist that monitor the structural health, detect damage, and estimate the state of structural durability of structures, such as aircraft structures. For example, in such known sensor systems and methods for NDI, the sensors in use may be mounted or embedded in composite or metallic structures, such as composite or metallic aircraft structures. However, when the sensors of such known sensor systems and methods are subjected to adverse environmental conditions and/or varying temperature conditions, such as very high temperatures (e.g., 212° F. (two hundred twelve degrees Fahrenheit) or higher) or very low or freezing temperatures (e.g., −78° F. (minus seventy-eight degrees Fahrenheit) or lower), the performance accuracy of the sensors may be affected or the sensors may prematurely fail. If the performance accuracy of the sensors is affected, or the sensors prematurely fail while in use, the sensors may have to be removed and replaced. This may result in increased labor and rework costs and increased out-of-service time of the aircraft. Moreover, if the performance accuracy of the sensors is affected, or the sensors prematurely fail while in use, the structural health monitoring and damage detection of the structure may be delayed or impaired, which in turn, may delay or hinder maintenance of the structure that may be needed.

In addition, known sensor systems and methods for NDI may not be able to accurately detect the depth and location of internal damage to a structure, such as an aircraft structure, that may occur as a result of external impact to the structure, and in particular, if the external impact to the structure is not visible. In order to confirm the depth and location of such internal damage, the structure, such as the aircraft structure, may need to be disassembled and inspected. This may result in increased labor and rework costs and increased out-of-service time of the aircraft.

Accordingly, it is desirable that the sensors of such known sensor systems and methods be able to survive and perform accurately when subjected to adverse environmental conditions and/or varying temperature conditions, and that such sensors be able to detect the depth and location of internal damage to a structure that may occur as a result of external impact to the structure. Thus, there is a need in the art for systems and methods for environmental testing and evaluation of sensors, such as sensors used for NDI of structures, to ensure that such sensors survive and maintain their accuracy under adverse environmental conditions and/or varying temperature conditions, and to accurately detect the depth and location of internal damage to a structure that may occur as a result of external impact to the structure, without having to take the structure apart.

SUMMARY

This need for systems and methods for environmental testing and evaluation of sensors, such as sensors used for NDI of structures, is satisfied. As discussed in the below detailed description, embodiments of the systems and methods for environmental testing and evaluation of sensors, such as sensors used for NDI of structures, may provide significant advantages over known systems and methods.

In one embodiment of the disclosure, there is provided a system for environmental testing and evaluation of non-destructive inspection (NDI) sensors. The system comprises a structure having a plurality of NDI sensors to be tested. The system further comprises an environmental chamber containing one or more heating elements and one or more cooling elements configured for heating and cooling the NDI sensors when the structure is secured to the environmental chamber. The system further comprises an impact testing assembly positioned over the structure and configured for impacting the structure. The system further comprises a data acquisition computer subsystem coupled to the environmental chamber and coupled to the NDI sensors. The data acquisition computer subsystem is configured to control and monitor the one or more heating elements and the one or more cooling elements, and is configured to collect and process temperature and impact data acquired by the NDI sensors to obtain a temperature profile for the structure, to determine one or more installation locations for the NDI sensors on the structure, and to detect a depth and a location of any internal damage to the structure resulting from impact to the structure.

In another embodiment of the disclosure, there is provided a computer-enabled system for environmental testing and evaluation of non-destructive inspection (NDI) sensors on an aircraft structure. The system comprises an aircraft structure having a plurality of NDI sensors to be tested. The system further comprises an environmental chamber containing one or more heating elements and one or more cooling elements configured for heating and cooling the NDI sensors when the aircraft structure is secured to the environmental chamber. The system further comprises an impact testing assembly positioned over the aircraft structure and configured for impacting the aircraft structure. The system further comprises a data acquisition computer subsystem coupled to the environmental chamber and coupled to the NDI sensors. The data acquisition computer subsystem is configured to control and monitor the one or more heating elements and the one or more cooling elements, and is configured to collect and process temperature and impact data acquired by the NDI sensors to obtain a temperature profile for the aircraft structure, to determine one or more installation locations for the NDI sensors on the aircraft structure, and to detect a depth and a location of any internal damage to the aircraft structure resulting from impact to the aircraft structure.

In another embodiment of the disclosure, there is provided a method for environmental testing and evaluation of non-destructive inspection (NDI) sensors. The method comprises the step of performing a room temperature evaluation with an impact testing assembly impacting a structure under test. The structure has a plurality of NDI sensors that collect room temperature impact data. The method further comprises the step of performing an elevated temperature evaluation with the impact testing assembly impacting the structure under test, and the NDI sensors collecting elevated temperature impact data. The method further comprises the step of performing a freezing temperature evaluation with the impact testing assembly impacting the structure under test, and the NDI sensors collecting freezing temperature impact data. The method further comprises the step of repeating the steps of performing the room temperature evaluation, performing the elevated temperature evaluation, and performing the freezing temperature evaluation, the repeated steps performed at varying temperature levels, at varying impact energy levels, and at multiple sensor locations. The method further comprises the step of obtaining a temperature profile for the structure under test by using a data acquisition computer subsystem. The method further comprises the step of displaying impact testing results with the data acquisition computer subsystem. The method further comprises the step of determining, based on the impact testing results, one or more installation locations for the NDI sensors on the structure.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and will fully convey the scope of the disclosure to those skilled in the art.

Figure 1:
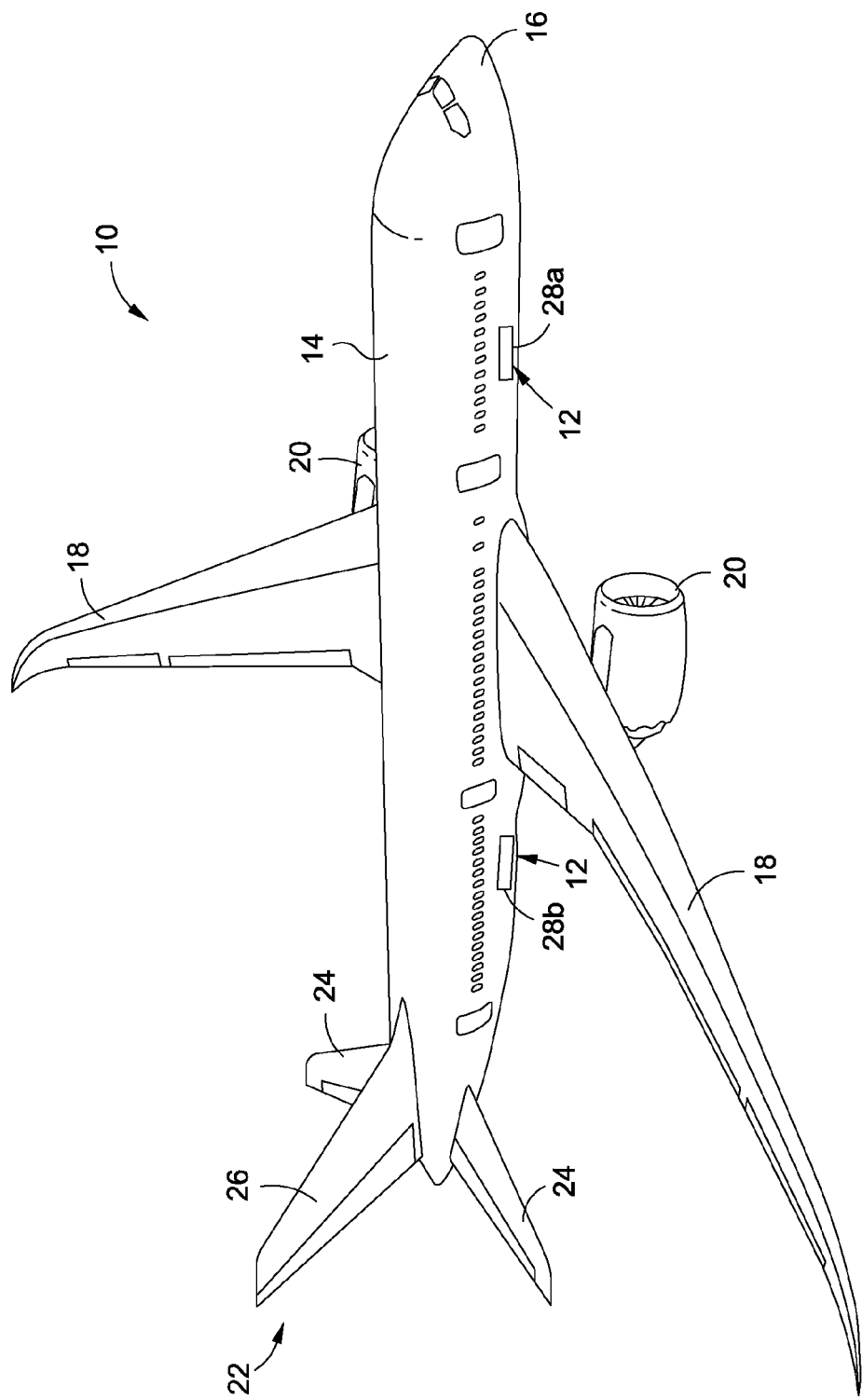
FIG. 1 is an illustration of a perspective view of an aircraft having one or more aircraft structures that may use non-destructive inspection (NDI) sensors tested and evaluated with embodiments of a system and a method of the disclosure.

Now referring to the Figures, FIG. 1 is an illustration of a perspective view of an aircraft 10 having one or more aircraft structures 12 that may use a plurality of non-destructive inspection (NDI) sensors 130 (see FIGS. 5A-5B), where the plurality of NDI sensors 130 are preferably tested and evaluated with embodiments of a method 70 (see FIG. 4) and a system 100 (see FIGS. 5A-5B) of the disclosure. As shown in FIG. 1, the aircraft 10 comprises a fuselage 14, a nose 16, wings 18, one or more propulsion units 20, and an empennage 22 comprising horizontal stabilizers 24 and a vertical stabilizer 26. As further shown in FIG. 1, the one or more aircraft structures 12 of the aircraft 10 that may use the plurality of NDI sensors 130 (see FIGS. 5A-5B) may include, for example, a forward cargo door 28a and an aft cargo door 28b. However, other aircraft structures 12 may also use the plurality of NDI sensors 130. Although the aircraft 10 shown in FIG. 1 is generally representative of a commercial passenger aircraft having one or more aircraft structures 12 that may use the plurality of NDI sensors 130 (see FIGS. 5A-5B) tested and evaluated with the method 70 and the system 100 disclosed herein, the teachings of the disclosed embodiments of the method 70 and the system 100 may be equally applicable to NDI sensors used on other aerial vehicles such as cargo aircraft, military aircraft, rotorcraft, and other types of aircraft or aerial vehicles; land-based vehicles such as trains, automobiles, trucks, buses, or other land-based vehicles; water-based vehicles such boats, submarines, or other water-based vehicles; or other suitable vehicles and architectural structures that may use NDI sensors.

Figure 2:
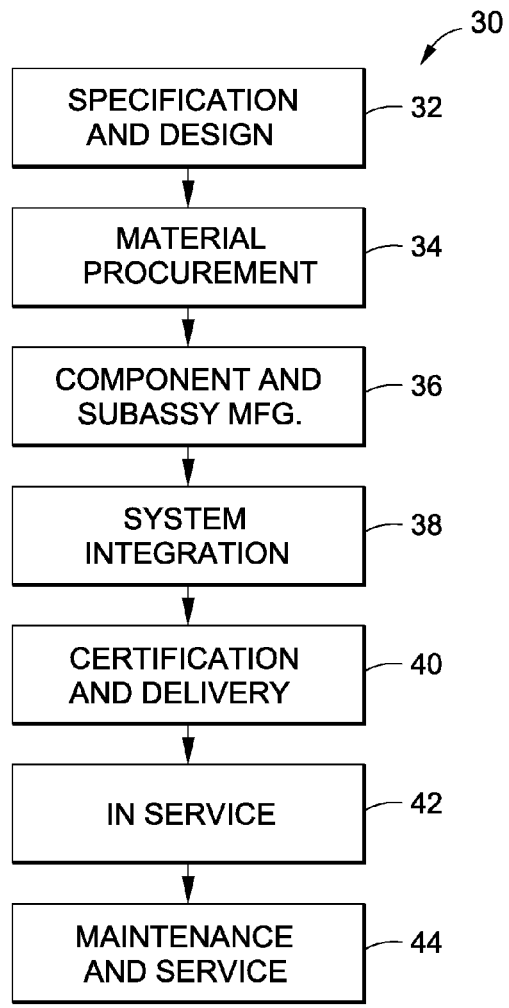
FIG. 2 is an illustration of a flow diagram of an embodiment of an aircraft production and service method of the disclosure.
Figure 3:
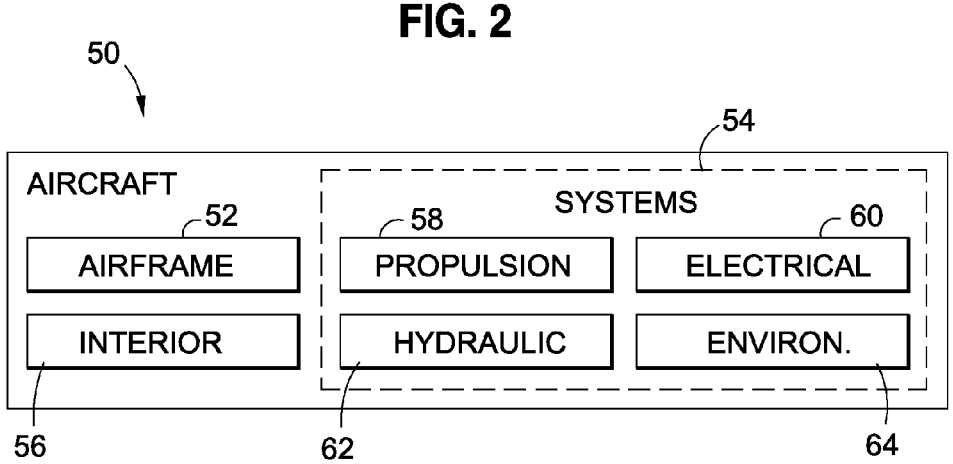
FIG. 3 is an illustration of a functional block diagram of an embodiment of an aircraft of the disclosure.

FIG. 2 is an illustration of a flow diagram of an embodiment of an aircraft production and service method 30 of the disclosure. FIG. 3 is an illustration of a functional block diagram of an embodiment of an aircraft 50 of the disclosure. Referring to FIGS. 2-3, embodiments of the disclosure may be described in the context of the aircraft manufacturing and service method 30 as shown in FIG. 2, and the aircraft 50 as shown in FIG. 3. During pre-production, the exemplary aircraft manufacturing and service method 30 may include specification and design 32 of the aircraft 50 and material procurement 34. During production, component and subassembly manufacturing 36 and system integration 38 of the aircraft 50 takes place. Thereafter, the aircraft 50 may go through certification and delivery 40 in order to be placed in service 42. While in service 42 by a customer, the aircraft 50 is scheduled for routine maintenance and service 44 (which may also include modification, reconfiguration, refurbishment, and so on).

Each of the processes of the aircraft manufacturing and service method 30 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and other suitable operators.

As shown in FIG. 3, the aircraft 50 produced by the exemplary aircraft manufacturing and service method 30 may include an airframe 52 with a plurality of high-level systems 54 and an interior 56. Examples of high-level systems 54 may include one or more of a propulsion system 58, an electrical system 60, a hydraulic system 62, and an environmental system 64. Any number of other systems may be included. Although an aerospace example is shown, the principles of the disclosed embodiments may be applied to other industries, such as the automotive industry.

Methods and structures embodied herein may be employed during any one or more of the stages of the aircraft manufacturing and service method 30. For example, components or subassemblies corresponding to component and subassembly manufacturing 36 may be fabricated or manufactured in a manner similar to components or subassemblies produced while the aircraft 50 is in service 42. Also, one or more apparatus embodiments, method embodiments, or a combination thereof, may be utilized during the component and subassembly manufacturing 36 and system integration 38, for example, by substantially expediting assembly of or reducing the cost of an aircraft 50. Similarly, one or more of apparatus embodiments, method embodiments, or a combination thereof, may be utilized while the aircraft 50 is in service 42, for example and without limitation, to routine maintenance and service 44.

Figure 5A:
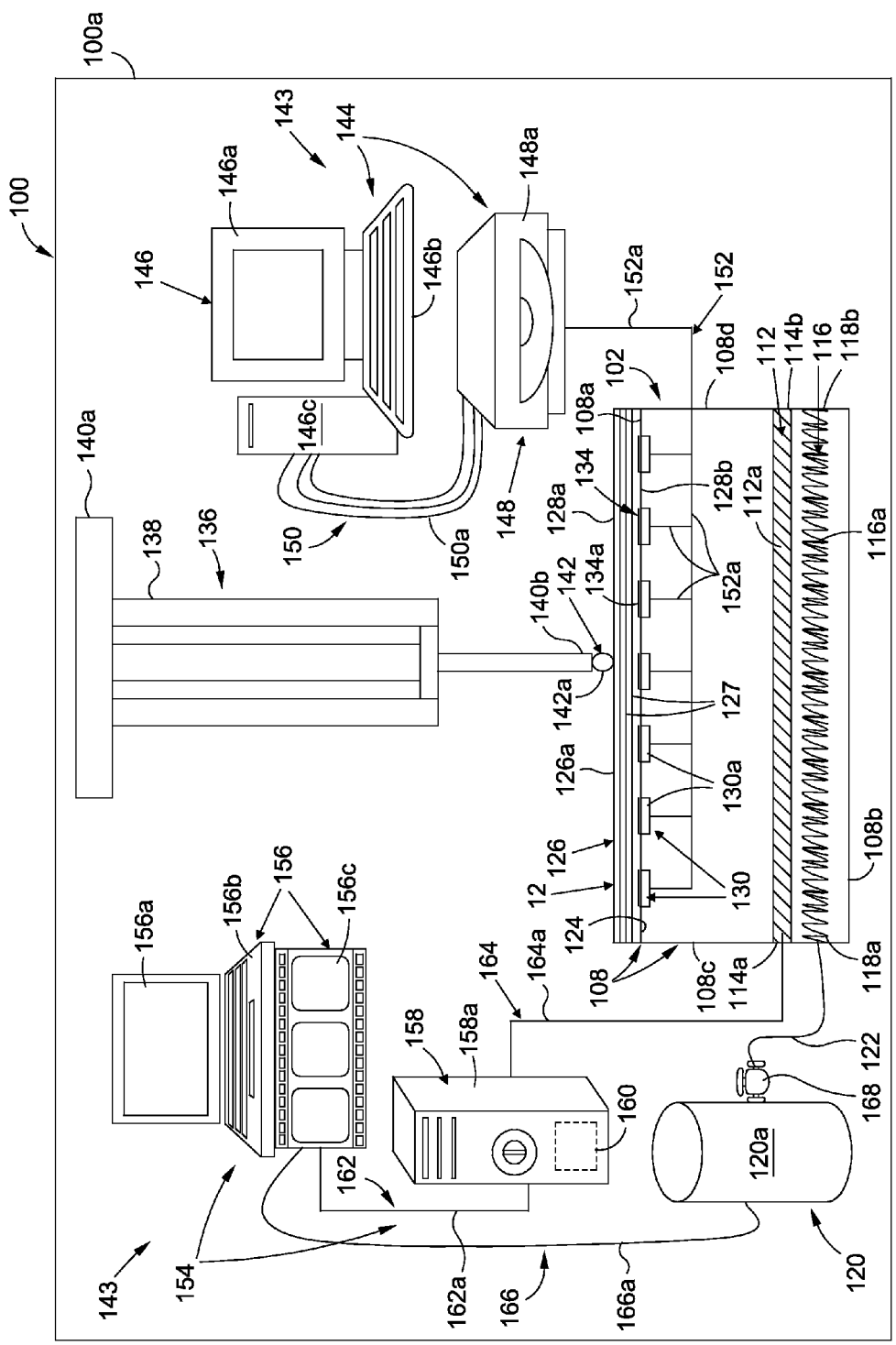
FIG. 5A is an illustration of a schematic view of one of the embodiments of a system of the disclosure.
Figure 5B:
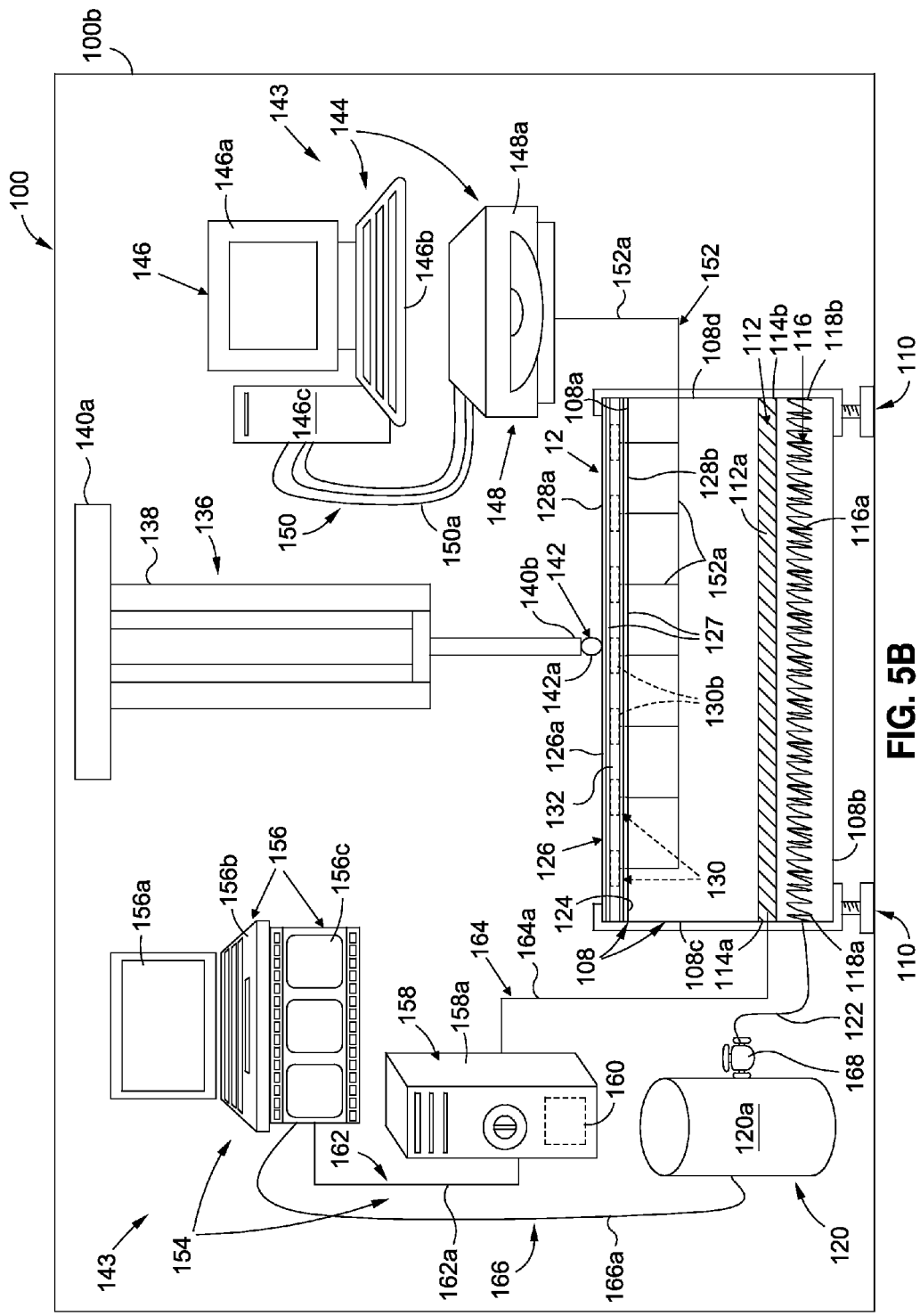
FIG. 5B is an illustration of a schematic view of another one of the embodiments of a system of the disclosure.

In one embodiment of the disclosure, as shown in FIGS. 5A-5B, there is provided a system 100 for environmental testing and evaluation of the plurality of non-destructive inspection (NDI) sensors 130, such as smart NDI sensors. FIG. 5A is an illustration of a schematic view of one of the embodiments of the system 100, such as in the form of computer-enabled system 100a, of the disclosure. FIG. 5B is an illustration of a schematic view of another one of the embodiments of the system 100, such as in the form of computer-enabled system 100b, of the disclosure.

As shown in FIGS. 5A-5B, the system 100 comprises a structure 126 having a plurality of non-destructive inspection (NDI) sensors 130 to be tested. The plurality of NDI sensors 130 are preferably coupled to the structure 126, such as by being mounted on, or embedded within, the structure 126. The structure 126 may comprise a component part structure 126a, such as a component part structure 126a of an aircraft structure 12 (see also FIG. 1), for example, a component part structure 126a of a forward cargo door 28a (see FIG. 1) or an aft cargo door 28b (see FIG. 1). However, the structure 126 may also comprise other component parts structures 126a of aircraft structures 12, such as of the wings 18 (see FIG. 1) or the empennage 22 (see FIG. 1). Preferably, the structure 126, such as the aircraft structure 12, is made of a composite material, a metal material, or a combination thereof. More preferably, the structure 126, such as the aircraft structure 12, is a composite material. As shown in FIGS. 5A-5B, the structure 126 has an impact side 128a and an attachment side 128b opposite the impact side 128a.

The plurality of NDI sensors 130 may comprise piezoelectric sensors, piezoelectric sensors and actuators embedded on a dielectric carrier film, fiber-powered active sensors, accelerometer-based sensors, nanosensors, NDI sensors integrated with radio frequency identification (RFID) tags, active sensor nodes, active sensor fibers, active sensor wires, sensor fiber optic wires, sensor coatings on fibers, carbon nanotubes, passive sensors, electrode sensors, pulse-echo (PE) sensors, pitch-catch active sensors, through transmission (TT) sensors, shear wave sensors, resonance sensors, mechanical impedance sensors, lamb wave sensors, rayleigh wave sensors, stoneley wave sensors, a combination thereof, or another suitable NDI sensor. The plurality of NDI sensors 130 are preferably capable of successfully testing and operating at an elevated temperature of 212° F. (two hundred twelve degrees Fahrenheit) or higher, and are preferably capable of successfully testing and operating at a freezing temperature of −78° F. (minus seventy-eight degrees Fahrenheit) or lower.

The plurality of NDI sensors 130 may comprise "smart sensors". For purposes of this application, "smart sensors" include smart sensors defined by the Institute of Electrical and Electronics Engineers (IEEE) 1451.4 standard, as sensors with small memory and standardized physical connection to enable the communication with processor and data network, and also include sensors having signal conditioning, embedded algorithms, and digital interfaces, as well as sensors having processing with a dedicated architecture to aggregate external sensor data. Sensors in general may be detectors acting as converters by measuring a physical quantity and converting that quantity into signals that may be read by a human observer or that may be react by electronic devices.

In one embodiment as shown in FIG. 5A, the plurality of NDI sensors 130 may be in the form of bonded NDI sensors 130a. The bonded NDI sensors 130a are preferably bonded or mounted to the attachment side 128b of the structure 126 with a bonding agent 134 (see FIG. 5A), such as an adhesive 134a (see FIG. 5A). The adhesive 134a may comprise an epoxy adhesive, such as a permanent epoxy adhesive, or a mounting tape made of a permanent epoxy adhesive; a polyurethane adhesive; a toughened acrylic adhesive; or another suitable adhesive. The bonded NDI sensors 130a may be individually surface bonded or mounted with the bonding agent 134, followed by pressure and heat to cure and seal the bonding agent 134. Preferably, the bonding agent 134, such as the adhesive 134a, is able to survive and maintain its bonding capability at elevated or high temperatures, including at an elevated temperature of 212° F. (two hundred twelve degrees Fahrenheit) or higher, without causing disbond of the bonded NDI sensors 130a from the structure 126 when tested, and without causing disbond of the bonded NDI sensors 130a from the aircraft structure 12 when in operation. Preferably, the bonding agent 134, such as the adhesive 134a, is able to survive and maintain its bonding capability at freezing or low temperatures, including at a freezing temperature of −78° F. (minus seventy-eight degrees Fahrenheit) or lower, without causing disbond of the bonded NDI sensors 130a from the structure 126 when tested, and without causing disbond of the bonded NDI sensors 130a from the aircraft structure 12 when in operation.

In another embodiment as shown in FIG. 5B, the plurality of NDI sensors 130 may be in the form of embedded NDI sensors 130b. As shown in FIG. 5B, the embedded NDI sensors 130b are embedded in an interior 132 of the structure 126 to be tested. For example, embedded NDI sensors 130b may be embedded by laying them in the component part structure 126a, such as a composite prepreg part, and co-curing the embedded NDI sensors 130b with the composite prepreg part. It is preferable to embed the plurality of NDI sensors 130 in an aircraft structure 12, if the aircraft structure 12 is part of an area, such as a forward cargo door 28a (see FIG. 1) or an aft cargo door 28b (see FIG. 1), that is subject to frequent activity, such as maintenance or loading and unloading, that could cause the plurality of NDI sensors 130 to be knocked off or damaged if they were mounted to the surface of the aircraft structure 12.

Figure 6:
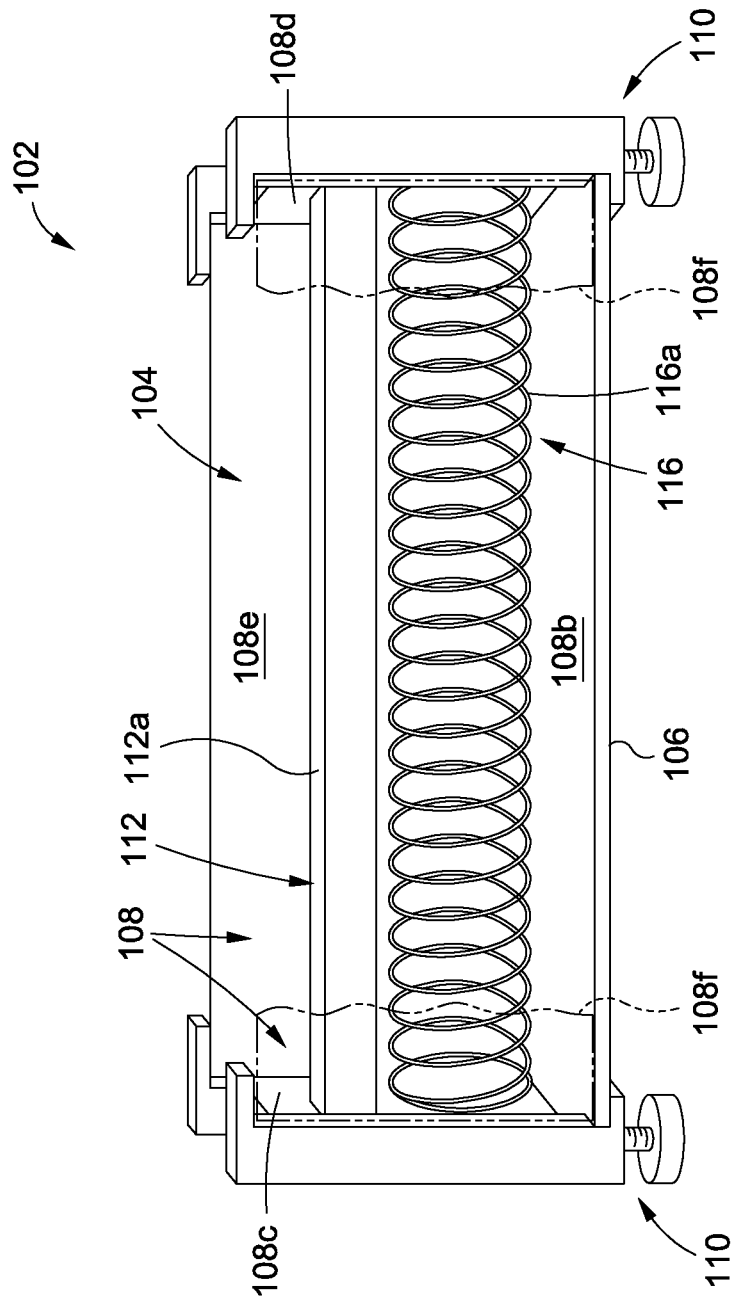
FIG. 6 is an illustration of a cut-away front perspective view of one of the embodiments of an environmental chamber that may be used in embodiments of a system and a method of the disclosure.

As shown in FIGS. 5A-5B and FIG. 6 the system 100 further comprises an environmental chamber 102. FIG. 6 is an illustration of a cut-away front perspective view of one of the embodiments of the environmental chamber 102 that may be used in embodiments of the system 100 and the method 70 of the disclosure. As shown in FIG. 6, the environmental chamber 102 comprises an interior portion 104, an exterior portion 106, and sides 108 (see also FIGS. 5A-5B). As shown in FIGS. 5A-5B and FIG. 6, the sides 108 may comprise a first side 108a (see FIGS. 5A-5B), a second side 108b (see FIGS. 5A-5B, 6), a third side 108c (see FIGS. 5A-5B, 6), a fourth side 108d (see FIGS. 5A-5B, 6), a fifth side 108e (see FIG. 6), and a sixth side 108f (see FIG. 6). Preferably, the sides 108 form an enclosed rectangular box-shaped chamber. The structure 126 is preferably positioned on top of the first side 108a and may be positioned and secured on a top surface portion 124 (see FIGS. 5A-5B) on the first side 108a. Preferably, the environmental chamber 102 is closed during testing of the plurality of NDI sensors 130 coupled to the structure 126. In one embodiment as shown in FIG. 5A, bonded NDI sensors 130a are surface mounted onto the attachment side 128b of the structure 126 comprised of layers 127 of composite material. The sensor mounting process may be carried out during or after the manufacturing process. As shown in FIG. 5A, the bonded NDI sensors 130a are preferably bonded to the attachment side 128b of the structure 126 using a bonding agent 134, such as a layer of an adhesive 134a. In another embodiment as shown in FIG. 5B, embedded NDI sensors 130b are embedded within the structure 126. The sensor embedding process may be carried out during the manufacturing process of the structure 126. The sensors embedded NDI sensors 130b are preferably sandwiched between layers 127 (see FIG. 5B) of composite material and co-cured in an oven.

As shown in FIGS. 5A-5B and FIG. 6, the system 100 may further comprise one or more adjustable leveling devices 110 that may be attached to the environmental chamber 102. As shown in FIG. 6, the adjustable leveling devices 110 may be attached to the environmental chamber 102, for example, by attaching to the bottom ends of the second side 108b, along the third side 108c and along the fourth side 108d, respectively, and to the top ends of the first side 108a. The adjustable leveling devices 110 may be used to adjust the level of the environmental chamber 102 in order to ensure that the structure 126, and in particular, the impact side 128a (see FIGS. 5A-5B) of the structure 126, is substantially level or balanced during testing of the plurality of NDI sensors 130.

As shown in FIGS. 5A-5B and FIG. 6, the system 100 further comprises one or more heating elements 112 contained within the environmental chamber 102. The one or more heating elements 112 may be positioned within the interior portion 104 (see FIG. 6) of the environmental chamber 102 and may extend across a length of the environmental chamber 102 between the third side 108c (see FIGS. 5A-5B) and the fourth side 108d (see FIGS. 5A-5B) of the environmental chamber 102. The one or more heating elements 112 are preferably configured to provide uniform heating of the structure 126 and of the plurality of NDI sensors 130, when the structure 126 with the attached plurality of NDI sensors 130 is secured to the environmental chamber 102. The one or more heating elements 112 are configured to heat the plurality of NDI sensors 130 to the required elevated temperatures for evaluation of the plurality of NDI sensors 130 at this temperature condition. Preferably, the one or more heating elements 112 have the heating capability to heat the structure 126 and the plurality of NDI sensors 130 to an elevated temperature of 212° F. (two hundred twelve degrees Fahrenheit) or higher.

The one or more heating elements 112 may comprise one or more rectangular heating elements 112a (see FIGS. 5A-5B), each heating element 112 having a first end 114a (see FIGS. 5A-5B) and a second end 114b (see FIGS. 5A-5B). Preferably, the heating element 112 is a single rectangular heating element 112a. However, multiple heating elements 112 may also be used if numerous NDI sensors 130 are tested and evaluated. As shown in FIGS. 5A-5B, the first end 114a of the heating element 112 is connected to a data acquisition computer subsystem 143 (see FIGS. 5A-5B), discussed in detail below. The one or more heating elements 112 may be turned on and off in order to elevate or raise the temperature of the environmental chamber 102, or to return it to room temperature, for example, for the evaluation of the plurality of NDI sensors 130 at room temperature.

As shown in FIGS. 5A-5B and FIG. 6, the system 100 further comprises one or more cooling elements 116 contained within the environmental chamber 102. The one or more cooling elements 116 may be positioned within the interior portion 104 (see FIG. 6) of the environmental chamber 102 and may extend across a length of the bottom of the environmental chamber 102 between the third side 108c (see FIGS. 5A-5B) and the fourth side 108d (see FIGS. 5A-5B) of the environmental chamber 102. The one or more cooling elements 116 are preferably configured to provide uniform cooling of the structure 126 to be tested and of the plurality of NDI sensors 130, when the structure 126 with the attached plurality of NDI sensors 130 is secured to the environmental chamber 102. The one or more cooling elements 116 are configured to cool the plurality of NDI sensors 130 to the required cooling or freezing temperatures for evaluation of the plurality of NDI sensors 130 at this temperature condition. Preferably, the one or more cooling elements 116 have the cooling capability to cool or freeze the structure 126 and the plurality of NDI sensors 130 to a freezing temperature of −78° F. (minus seventy-eight degrees Fahrenheit) or lower.

The one or more cooling elements 116 may comprise one or more cooling coils 116a (see FIGS. 5A-5B), each cooling element 116 having a first end 118a (see FIGS. 5A-5B) and a second end 118b (see FIGS. 5A-5B). Preferably, the cooling element 116 is a single cooling coil 116a. However, multiple cooling elements 116 may also be used if numerous NDI sensors 130 are tested and evaluated. As shown in FIGS. 5A-5B, the first end 118a of the cooling element 116 is preferably connected to a cooling source 120 (see FIGS. 5A-5B) located external to the environmental chamber 102. The cooling source 120 is preferably a liquid nitrogen tank 120a (see FIGS. 5A-5B) containing liquid nitrogen which may be supplied to the one or more cooling elements 116 via a cooling source connector element 122 (see FIGS. 5A-5B). The cooling source 120, such as in the form of the liquid nitrogen tank 120a, may also have a regulator valve 168 (see FIGS. 5A-5B) for regulating the flow of liquid nitrogen from the liquid nitrogen tank 120a, through the cooling source connector element 122, to the one or more cooling elements 116. As shown in FIGS. 5A-5B, the cooling source 120 is connected to a data acquisition computer subsystem 143 (see FIGS. 5A-5B), discussed in detail below. The cooling source 120 may be turned on or off to start or stop the flow of liquid nitrogen to the one or more cooling elements 116 in order to lower the temperature of the environmental chamber 102, or to return it to room temperature, for example, for the evaluation of the plurality of NDI sensors 130 at room temperature.

As shown in FIGS. 5A-5B, the system 100 further comprises an impact testing assembly 136 that is preferably positioned over the structure 12 with the plurality of NDI sensors 130 to be tested. The impact testing assembly 136 is configured for impacting the structure 12 during testing. As further shown in FIGS. 5A-5B, the impact testing assembly 136 preferably comprises an impacting device 138 having a first end 140a and a second end 140b. As further shown in FIGS. 5A-5B, the second end 140b has an impactor element 142 configured for impacting the impact side 128a of the structure 126 to be tested. The impactor element 142 may be in the form of a metal ball impactor element 142a (see FIGS. 5A-5B), such as, for example, a steel ball, that is sufficiently hard and strong to effectively impact the structure 126, and in turn, impact the plurality of NDI sensors 130 that may be either embedded in the structure 126 or bonded to the attachment side 128b (see FIGS. 5A-5B) of the structure 126. The impactor element 142 may create dents in the structure 126 during impact of the structure 126. The strength and force of the impactor element 142 may be regulated, varied and controlled using a computer (not shown) equipped with a controller (not shown) and coupled to the impacting device 138.

The impactor element 142 preferably impacts the structure 126 with multiple impacts in multiple locations, such as, for example, three triangulated impacts in 10-12 locations. The impact testing assembly 136 may be in the form of a drop weight impact machine having an impactor element configured to impact or strike the structure 126 under defined, energy-controlled conditions. An exemplary impact testing assembly 136 that may be used, for example, is the INSTRON® DYNATUP® Model 8250 drop weight impact tester from Instron Corporation of Norwood, Mass.

As shown in FIGS. 5A-5B, the system 100 further comprises a data acquisition computer subsystem 143 coupled to the environmental chamber 102 and coupled to the plurality of NDI sensors 130. The data acquisition computer subsystem 143 is preferably configured to control, monitor, and regulate the temperature of both the one or more heating elements 112 and the one or more cooling elements 116. The data acquisition computer subsystem 143 is further preferably configured to collect and process temperature and impact data acquired by the plurality of NDI sensors 130, in order to obtain a temperature profile for the structure 126 and/or the aircraft structure 12, to determine one or more installation locations for the plurality of NDI sensors 130 on the aircraft structure 12. The data acquisition computer subsystem 143 is further preferably configured to detect a depth and a location of any internal damage to the structure 126, and/or the aircraft structure 12, resulting from impact to the structure 126 and/or the aircraft structure 12.

As further shown in FIGS. 5A-5B, the data acquisition computer subsystem 143 comprises a sensor processing and monitoring assembly 144 coupled to the plurality of NDI sensors 130. The sensor processing and monitoring assembly 144 comprises a sensor processing computer 146 (see FIGS. 5A-5B). The sensor processing computer 146 preferably comprises a monitor 146a (see FIGS. 5A-5B), a keyboard 146b (see FIGS. 5A-5B), and a power source/processor device 146c (see FIGS. 5A-5B). The sensor processing and monitoring assembly 144 further comprises a sensor monitoring unit 148 (see FIGS. 5A-5B), such as in the form of a sensor monitoring compact disk device 148a (see FIGS. 5A-5B). The sensor processing computer 146 is preferably connected to the sensor monitoring unit 148 via one or more connector elements 150 (see FIGS. 5A-5B), such as in the form of one or more computer connector cables 150a (see FIGS. 5A-5B). The sensor monitoring unit 148 of the sensor processing and monitoring assembly 144 is preferably connected to the plurality of NDI sensors 130 via one or more sensor connector elements 152 (see FIGS. 5A-5B), such as in the form of one or more sensor connector cables 152a (see FIGS. 5A-5B). The sensor processing and monitoring assembly 144 is preferably connected to the plurality of NDI sensors 130 for control, impact, and sensor response measurement, so as to timely access functionality and accuracy determination under varying temperature conditions.

In an alternate embodiment, the sensor processing and monitoring assembly 144 may be a single unit where the sensor processing computer 146 and the sensor monitoring unit 148 may be combined into a single, compact microprocessor device (not shown). The microprocessor device may be wirelessly connected to the plurality of NDI sensors 130, and the microprocessor may control wireless communication between the plurality of NDI sensors 130 and the sensor processing and monitoring assembly 144, remote from the plurality of NDI sensors 130.

As further shown in FIGS. 5A-5B, the data acquisition computer subsystem 143 further comprises a data collection and controller assembly 154 coupled to the one or more heating elements 112 and coupled to the one or more cooling elements 116. The data collection and controller assembly 154 comprises a data collection and monitoring computer 156 (see FIGS. 5A-5B). The data collection and monitoring computer 156 preferably comprises a monitor 156a (see FIGS. 5A-5B), a keyboard 156b (see FIGS. 5A-5B), and a power source/processor device 156c (see FIGS. 5A-5B). The data collection and monitoring computer 156 is configured to ensure that the temperatures of the one or more heating elements 112 and one or more cooling elements 114 are uniform and that they are monitored. The data collection and monitoring computer 156 preferably monitors the temperature of each of the locations of the plurality of NDI sensors 130.

The data collection and controller assembly 154 further comprises a controller device 158 (see FIGS. 5A-5B), such as in the form of a control unit with thermocouple device 158a (see FIGS. 5A-5B). The controller device 158 may further comprise a power source 160 (see FIGS. 5A-5B). Thus, the data acquisition computer subsystem 143 preferably comprises one or more power sources, such as power source/processor device 146c, power source/processor device 156c, power source 160, or another suitable power source, configured for providing power to the system 100. The system 100 may be manually operated, automated, or a combination of manual operation and automation.

The controller device 158 is preferably connected to the data collection and monitoring computer 156 via one or more connector elements 162 (see FIGS. 5A-5B), such as in the form of one or more computer connector cables 162a (see FIGS. 5A-5B). The controller device 158 of the data collection and controller assembly 154 is preferably connected to the one or more heating elements 112 via one or more connector elements 164 (see FIGS. 5A-5B), such as in the form of one or more controller connector cables 164a (see FIGS. 5A-5B). The data collection and monitoring computer 156 of the data collection and controller assembly 154 is preferably connected to the one or more cooling elements 116 via the cooling source 120 (see FIGS. 5A-5B). The data collection and monitoring computer 156 of the data collection and controller assembly 154 is preferably connected to the cooling source 120 via one or more connector elements 166 (see FIGS. 5A-5B), such as in the form of one or more computer connector cables 166a (see FIGS. 5A-5B). The cooling source 120 is connected to the one or more cooling elements 116 via one or more cooling source connector elements 122.

In an alternate embodiment, the data collection and controller assembly 154 may be a single unit where the data collection and monitoring computer 156 and the controller device 158 may be combined into a single, compact microprocessor device (not shown). The microprocessor device may be wirelessly connected to the one or more heating elements 112 and to the one or more cooling elements 116, and the microprocessor device controls wireless communication between the microprocessor device and the one or more heating elements 112 and the one or more cooling elements 116.

In another embodiment of the disclosure, there is provided a computer-enabled system 100a (see FIG. 5A) or 100b (see FIG. 5B), for environmental testing and evaluation of non-destructive inspection (NDI) senors, such as smart NDI senors, on an aircraft structure 12 (see FIGS. 1, 5A-5B). The system 100a or 100b comprises an aircraft structure 12 having a plurality of NDI sensors 130 (see FIGS. 5A-5B) to be tested. The NDI sensors, such as smart NDI sensors, may be mounted on (see FIG. 5A), or embedded within (see FIG. 5B), the aircraft structure 12. The plurality of NDI sensors 130 are preferably capable of successfully operating at a temperature of 212° F. (two hundred twelve degrees Fahrenheit) or higher, and are preferably capable of successfully operating at a temperature of −78° F. (minus seventy-eight degrees Fahrenheit) or lower.

As shown in FIGS. 5A-5B, the system 100a, 100b, further comprises an environmental chamber 102 (see FIGS. 5A-5B) containing one or more heating elements 112 and one or more cooling elements 116 configured for heating and cooling the plurality of NDI sensors 130 when the aircraft structure 12 is secured to the environmental chamber 102. The system 100a, 100b, further comprises an impact testing assembly 136 (see FIGS. 5A-5B) positioned over the aircraft structure 12 and configured for impacting the aircraft structure 12. The system 100a, 100b, further comprises a data acquisition computer subsystem 143 (see FIGS. 5A-5B) coupled to the environmental chamber 102 and coupled to the plurality of NDI sensors 130. The data acquisition computer subsystem 143 is preferably configured to control and monitor the one or more heating elements 112 and the one or more cooling elements 116. The data acquisition computer subsystem 143 is preferably further configured to collect and process temperature and impact data acquired by the plurality of NDI sensors 130 to obtain a temperature profile for the aircraft structure 12, to determine one or more installation locations for the plurality of NDI sensors 130 on the aircraft structure 12, and to detect a depth and a location of any internal damage to the aircraft structure 12 resulting from impact to the aircraft structure 12.

Figure 4:
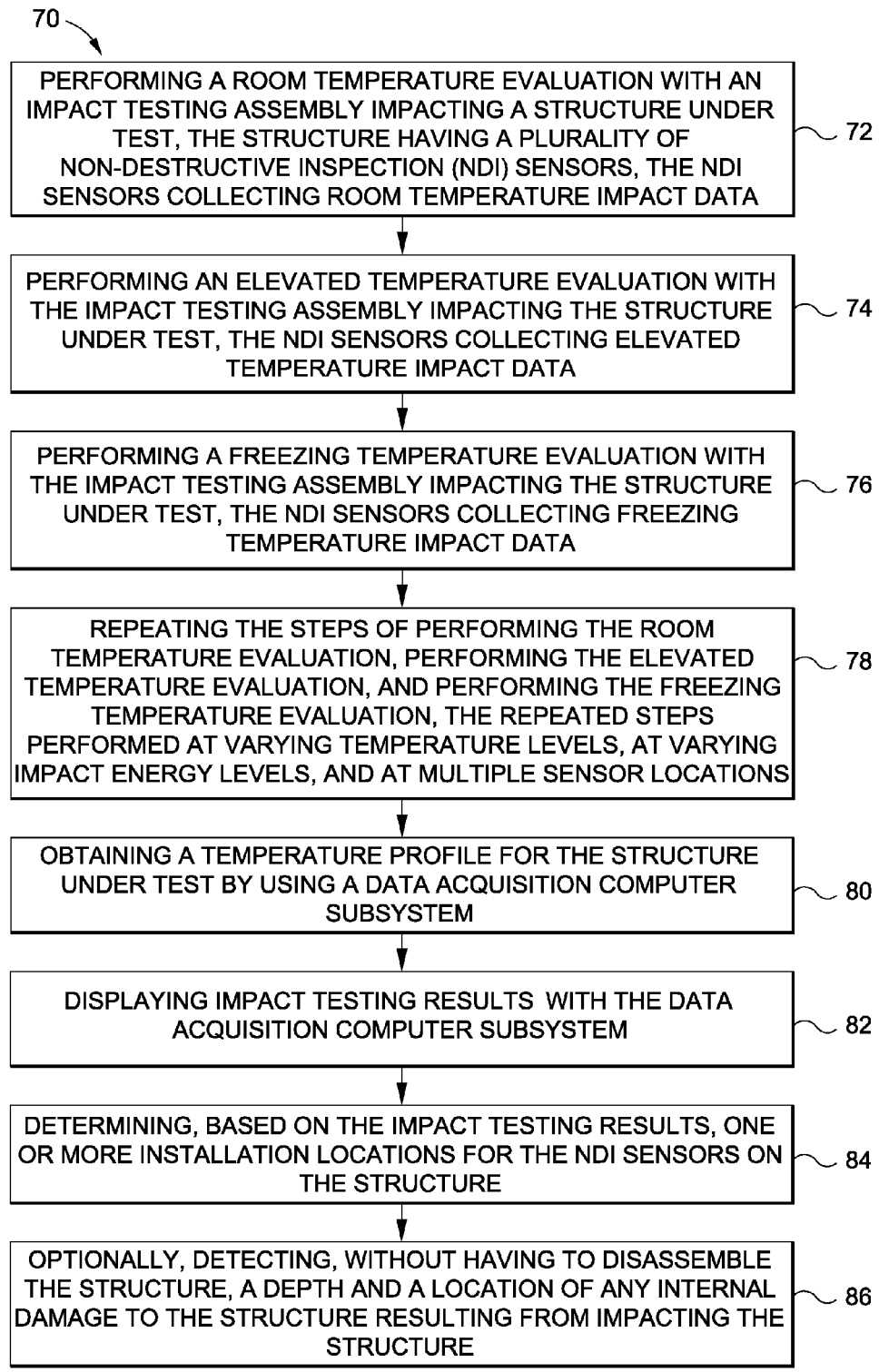
FIG. 4 is an illustration of a flow diagram of one of the embodiments of a method of the disclosure.

In another embodiment of the disclosure, as shown in FIG. 4, there is provided a method 70 for environmental testing and evaluation of the plurality of non-destructive inspection (NDI) sensors 130. As shown in FIG. 4, the method 70 comprises step 72 of performing a room temperature evaluation with the impact testing assembly 136 (see FIGS. 5A-5B) impacting a structure 126 (see FIGS. 5A-5B) having NDI sensors 130 under test. The impact testing assembly 136 that may be used is discussed in detail above. The structure 126 that may be used is also discussed in detail above and may comprise a component part structure 126a (see FIGS. 5A-5B), such as from an aircraft structure 12 (see FIG. 1 and FIGS. 5A-5B). The structure 126 may be made of a composite material, a metal material, or a combination of both a composite material and a metal material.

Prior to performing the room temperature evaluation, the plurality of NDI sensors 130 to be tested and evaluated are preferably coupled to the structure 126. The method 70 may further comprise positioning the plurality of NDI sensors 130 adjacent to the structure 126, or positioning the plurality of NDI sensors 130 within the structure 126. In one embodiment, as shown in FIG. 5A, the plurality of NDI sensors 130 may be in the form of bonded NDI sensors 130a (see FIG. 5A). The bonded NDI sensors 130a are preferably bonded or mounted to the attachment side 128b (see FIG. 5A) of the structure 126 (see FIG. 5A) with a bonding agent 134 (see FIG. 5A), such as an adhesive 134a (see FIG. 5A). In another embodiment as shown in FIG. 5B, the plurality of NDI sensors 130 may be in the form of embedded NDI sensors 130b (see FIG. 5B) embedded in an interior 132 (see FIG. 5B) of the structure 126 (see FIG. 5B). The plurality of NDI sensors 130 that may be used are discussed in detail above. The plurality of NDI sensors 130 are configured to collect room temperature impact data during the step 72 of performing the room temperature evaluation.

Prior to performing the room temperature evaluation, the structure 126 with the plurality of NDI sensors 130 is preferably mounted onto the environmental chamber 102 (see FIGS. 5A-5B). The attachment side 126b (see FIGS. 5A-5B) of the structure 126 is preferably positioned on a top surface portion 124 (see FIGS. 5A-5B) of the first side 108a (see FIGS. 5A-5B) of the environmental chamber 102. The structure 126 with the plurality of NDI sensors 130 is secured in place under the impact testing assembly 136 (see FIGS. 5A-5B). One or more adjustable leveling devices (see FIGS. 5A-5B and FIG. 6) may be attached to the environmental chamber 102 in order to level and balance the environmental chamber 102 and the structure 126 mounted on the environmental chamber 102, and in particular, in order to level and balance the impact side 128a (see FIGS. 5A-5B) of the structure 126 under the impactor element 142 (see FIGS. 5A-5B) of the impact testing assembly 136 (see FIGS. 5A-5B).

The step 72 of performing the room temperature evaluation may be performed by initially turning off the one or more heating elements 112 (see FIGS. 5A-5B) and closing off the cooling source 120 (see FIGS. 5A-5B) of liquid nitrogen to the one or more cooling elements 116 (see FIGS. 5A-5B), and allowing the temperatures of the environmental chamber 102 and the plurality of NDI sensors 130 to stabilize to room temperature or ambient temperature. Once the environmental chamber 102 and the plurality of NDI sensors 130 are both at room temperature or ambient temperature, the impact side 128a (see FIGS. 5A-5B) of the structure 126 is impacted with the impactor element 142 (see FIGS. 5A-5B) of the impact testing assembly 136. The plurality of NDI sensors 130 collect any room temperature impact data during the impacting at room temperature, and the collected room temperature impact data is transmitted to the sensor processing and monitoring assembly 144 (see FIGS. 5A-5B) for recording and processing.

As shown in FIG. 4, the method 70 further comprises step 74 of performing an elevated temperature evaluation with the impact testing assembly 136 (see FIGS. 5A-5B) impacting the structure 126 with the plurality of NDI sensors 130 under test. On completion of the step 72 of performing the room temperature evaluation, the temperatures of the environmental chamber 102 and the plurality of NDI sensors 130 may be increased to a desired elevated temperature by turning on and activating the one or more heating elements 112 (see FIGS. 5A-5B). The one or more heating elements 112 that may be used are discussed in detail above, and preferably comprise one or more rectangular heating elements 112a (see FIGS. 5A-5B) to provide an elevated temperature to heat the plurality of NDI sensors 130 to the required elevated or high temperature for evaluation. The one or more heating elements 112 are configured to heat the plurality of NDI sensors 130 when the structure 126 with the plurality of NDI sensors 130 is secured to the environmental chamber 102 (see FIGS. 5A-5B). The step 74 of performing the elevated temperature evaluation comprises testing the plurality of NDI sensors 130 for operation at various elevated or high temperatures, and preferably, at elevated temperatures of 212° F. (two hundred twelve degrees Fahrenheit) or higher.

At the elevated temperature, the structure 126 with the plurality of NDI sensors 130 is again impacted with the impact testing assembly 136. The plurality of NDI sensors 130 are configured to collect any elevated temperature impact data during the step 74 of performing the elevated temperature evaluation. The plurality of NDI sensors 130 collect any elevated temperature impact data during the impacting at the elevated temperature, and the collected elevated temperature impact data is transmitted to the sensor processing and monitoring assembly 144 (see FIGS. 5A-5B) for recording and processing. After a desired amount of elevated temperature impact data is collected and recorded, the one or more heating elements 112 are turned off in order to allow the elevated temperatures of the environmental chamber 102 and the plurality of NDI sensors 130 to lower and to allow the environmental chamber 102 and the plurality of NDI sensors 130 to cool down and return to room temperature or ambient temperature.

As shown in FIG. 4, the method 70 further comprises step 76 of performing a freezing temperature evaluation with the impact testing assembly 136 impacting the structure 126 under test. On completion of the step 74 of performing the elevated temperature evaluation, and once the temperatures of the environmental chamber 102 and the plurality of NDI sensors 130 have stabilized at room temperature or ambient temperature, the temperatures of the environmental chamber 102 and the plurality of NDI sensors 130 may be lowered to a desired freezing temperature. The cooling source 120 (see FIGS. 5A-5B), such as in the form of the liquid nitrogen tank 120a (see FIGS. 5A-5B), may be opened to allow liquid nitrogen to flow through the cooling source connector element 122 (see FIGS. 5A-5B) and into the environmental chamber 102 (see FIGS. 5A-5B) via the one or more cooling elements 116 (see FIGS. 5A-5B). The one or more cooling elements 116 that may be used are discussed in detail above, and preferably comprise one or more cooling coils 116a (see FIGS. 5A-5B) to provide a freezing temperature to cool the plurality of NDI sensors 130 to the required freezing or low temperature for evaluation. The one or more cooling elements 116 are configured to cool the plurality of NDI sensors 130 when the structure 126 with the plurality of NDI sensors 130 is secured to the environmental chamber 102 (see FIGS. 5A-5B). The step 76 of performing the freezing temperature evaluation comprises testing the plurality of NDI sensors 130 for operation at various freezing or low temperatures, and preferably, at freezing temperatures of −78° F. (minus seventy-eight degrees Fahrenheit) or lower.

At the freezing temperature, the structure 126 with the plurality of NDI sensors 130 is again impacted with the impact testing assembly 136. The plurality of NDI sensors 130 are configured to collect any freezing temperature impact data during the step 76 of performing the freezing temperature evaluation. The plurality of NDI sensors 130 collect any freezing temperature impact data during the impacting at the freezing temperature, and the collected freezing temperature impact data is transmitted to the sensor processing and monitoring assembly 144 (see FIGS. 5A-5B) for recording and processing. After a desired amount of freezing temperature impact data is collected and recorded, the cooling source 120 (see FIGS. 5A-5B), such as in the form of the liquid nitrogen tank 120a (see FIGS. 5A-5B), is closed to stop the flow of liquid nitrogen to the environmental chamber 102 (see FIGS. 5A-5B) via the one or more cooling elements 116 (see FIGS. 5A-5B). The temperatures of the environmental chamber 102 and the plurality of NDI sensors 130 then warms up and is allowed to return to room temperature or ambient temperature.

As shown in FIG. 4, the method 70 further comprises step 78 of repeating the step 72 of performing the room temperature evaluation, repeating the step 74 of performing the elevated temperature evaluation, and repeating the step 76 of performing the freezing temperature evaluation. The repeated steps 72, 74, 76, are preferably performed at varying temperature levels, at varying impact energy levels, and at multiple NDI sensor locations.

As shown in FIG. 4, the method 70 further comprises step 80 of obtaining a temperature profile for the structure 126 by using a data acquisition computer subsystem 143 (see FIGS. 5A-5B). The data acquisition computer subsystem 143, discussed in detail above, preferably comprises a sensor processing and monitoring assembly 144 (see FIGS. 5A-5B) coupled to the plurality of NDI sensors 130. The sensor processing and monitoring assembly 144 preferably comprises a sensor processing computer 146 (see FIGS. 5A-5B) and a sensor monitoring unit 148 (see FIGS. 5A-5B). The data acquisition computer subsystem 143 preferably further comprises a data collection and controller assembly 154 (see FIGS. 5A-5B) coupled to the one or more heating elements 112 and coupled to the one or more cooling elements 116. The data collection and controller assembly 154 preferably comprises a data collection and monitoring computer 156 (see FIGS. 5A-5B) and a controller device 158 (see FIGS. 5A-5B), such as in the form of a control unit with thermocouple device 158a (see FIGS. 5A-5B).

As shown in FIG. 4, the method 70 further comprises step 82 of displaying impact testing results with the data acquisition computer subsystem 143 (see FIGS. 5A-5B). For example, the impact testing results, such as the room temperature impact data, the elevated temperature impact data, and the freezing temperature impact data, may be displayed by the sensor processing and monitoring assembly 144 (see FIGS. 5A-5B). As shown in FIG. 4, the method 70 further comprises step 84 of determining, based on the impact testing results, one or more installation locations for the plurality of NDI sensors 130 on the structure 126 (see FIGS. 5A-5B) and/or on the aircraft structure 12 (see FIG. 1 and FIGS. 5A-5B).

As shown in FIG. 4, the method 70 may further comprise optional step 86 of detecting, without having to disassemble the structure 126 and/or disassemble the aircraft structure 12, a depth and a location of any internal damage to the structure 126 and/or the aircraft structure 12, resulting from impacting the structure 126 and/or the aircraft structure 12. The step 86 of detecting may comprise the plurality of NDI sensors 130 receiving and triangulating lamb waves transmitted through the structure 126 under test and/or the aircraft structure 12, due to impact of the structure 126 and/or the aircraft structure 12, and calculating and evaluating the lamb waves with the data acquisition computer subsystem 143 (see FIGS. 5A-5B) to determine the depth and the location of any internal damage to the structure 126 and/or the aircraft structure 12.

When the structure 126 is impacted, a vibration is produced and a lamb wave or mechanical sound width is propagated through the structure 126 to the NDI sensor 130 receiving the impact. The impacted NDI sensors receive and triangulate a series of lamb waves or mechanical sound widths propagated by the vibration through the structure 126, when the structure 126 is impacted by the impact testing assembly 136. The measurement of each impact may be measured by the lamb wave or mechanical sound width. The plurality of NDI sensors 130 transmit the lamb waves or mechanical sound widths to the data acquisition computer subsystem 143 (see FIGS. 5A-5B). The data acquisition computer subsystem 143 collects and processes the lamb waves or mechanical sound widths in order to display images of impact defects within the structure 126. For lamb wave imaging, the propagation speed of the lamb wave is a function of the material properties, as well as the thickness of the material, and in this case, of the material of the structure 126. If a crack or a delamination or a change in material properties occurs, the speed of propagation changes. Images of the NDI sensor detected impact damage may be displayed with the data acquisition computer subsystem 143 (see FIGS. 5A-5B). The data acquisition computer subsystem 143 has a built in algorithm that converts the data into plotted images, such as shown in the plots of FIGS. 7-11, showing the impact damage, its severity, size and location. The depth of the damage may be measured using a depth gage. After the images are determined, an evaluation of the size and location of the sensor detected impact damage may be performed using the built algorithm described above. Analytical models may be built using Finite Element Analysis (FEA), to try to evaluate the performance and functionality of the plurality of NDI sensors 130 based on detected impact damage at varying temperature conditions and at varying impact target energy levels. The FEA result of the models may be validated with experimental tests.

The above description of the preferred embodiments is merely exemplary in nature and is in no way intended to limit the disclosed embodiments or their applications or uses. While various preferred embodiments have been described, those skilled in the art will recognize modifications or variations which might be made without departing from the disclosed embodiments. For example, while it is envisioned the system 100 and method 70 may be used to test and evaluate a plurality of NDI sensors 130 used on an aircraft 10 (see FIG. 1), such as a commercial passenger aircraft, the system 100 and method 70 described herein are equally applicable to testing and evaluation of the plurality of NDI sensors 130 used on other aerial vehicles, aerospace vehicles, land-based vehicles, water-based vehicles, and other suitable vehicles. Further, while the plurality of NDI sensors 130 are shown coupled to the data acquisition computer subsystem 143 (see FIGS. 5A-5B) via various connector elements such as cables, the plurality of NDI sensors 130 may also be wirelessly coupled to the data acquisition computer subsystem 143 using wireless systems.

EXAMPLES

The system 100, as shown in FIGS. 5A-5B, was designed and used to test the plurality of NDI sensors 130 under different environmental conditions, including room temperature or ambient temperature, elevated temperature, and freezing temperature conditions. To understand the environmental profile, for example, a Finite Element Model (FEM) thermal analysis was performed that described a temperature profile for typical aircraft structures 12 (see FIG. 1) from the fuselage 14 (see FIG. 1) of an aircraft 10 (see FIG. 1), including a forward cargo door 28a (see FIG. 1) and an aft cargo door 28b (see FIG. 1). A temperature profile for the forward cargo door 28a (see FIG. 1) was obtained, which indicated possible locations where the plurality of NDI sensors 130 might be installed. In addition, a temperature profile for the aft cargo door 28b (see FIG. 1) was obtained, which indicated possible locations where the plurality of NDI sensors 130 might be installed.

Various sensor evaluation tests were conducted using the system 100 (see FIGS. 5A-5B) and method 70 (see FIG. 4) disclosed herein. The plurality of NDI sensors 130 (see FIGS. 5A-5B) to be tested and evaluated were mounted in a structure 126 (see FIGS. 5A-5B) under test. The NDI sensors tested and evaluated were piezoelectric sensors. The structure 126 was made of a composite material suitable for use in a forward cargo door 28a or aft cargo door 28b of an aircraft structure 12. The structure 126 with the plurality of NDI sensors 130 was mounted on the top surface portion 124 (see FIGS. 5A-5B) of the environmental chamber 102 (see FIGS. 5A-5B) and secured in place under the impact testing assembly 136 (see FIGS. 5A-5B). Adjustable leveling devices (see FIGS. 5A-5B and FIG. 6) were attached to the sides of the environmental chamber 102 in order to level and balance the environmental chamber 102 and the structure 126 mounted on the environmental chamber 102.

The data acquisition computer subsystem 143 (see FIGS. 5A-5B) was connected to the plurality of NDI sensors 130 for control, impact, and NDI sensor response measurement, so as to timely access functionality and accuracy determination under varying temperature conditions. The data acquisition computer subsystem 143 (see FIGS. 5A-5B) was also connected to the rectangular heating element 112a (see FIGS. 5A-5B) to control and monitor the temperature of the rectangular heating element 112a. The data acquisition computer subsystem 143 (see FIGS. 5A-5B) was also connected to the cooling source 120 (see FIGS. 5A-5B) to control and monitor the temperature of the cooling coil 116a.

The sensor evaluation tests were performed by first turning off the rectangular heating element 112a (see FIGS. 5A-5B) in the environmental chamber 102 (see FIGS. 5A-5B) and closing the cooling source 120 (see FIGS. 5A-5B) to stop any flow of liquid nitrogen to the cooling coil 116a (see FIGS. 5A-5B) in the environmental chamber 102. This allowed the temperature of the environmental chamber 102 (see FIGS. 5A-5B), the temperature of the structure 126, and the temperature of the NDI sensors 130 to stabilize at room temperature or ambient temperature. The structure 126 with the embedded and surface mounted NDI sensors 130 was impacted at room temperature using the impact testing assembly 136 (see FIGS. 5A-5B). The plurality of NDI sensors 130 collected the room temperature impact data, and the room temperature impact data was recorded and processed using the data acquisition computer subsystem 143 (see FIGS. 5A-5B).

On completion of the room temperature evaluation, the temperatures of the environmental chamber 102 and the plurality of the NDI sensors 130 were raised to a required elevated temperature by turning on and activating the rectangular heating element 112a (see FIGS. 5A-5B), and heating the rectangular heating element 112a to an elevated temperature of 212° F. (two hundred twelve degrees Fahrenheit) and higher. At the elevated temperature, the structure 126 with the embedded and surface mounted NDI sensors 130 was again impacted using the impact testing assembly 136 (see FIGS. 5A-5B). The plurality of NDI sensors 130 collected the elevated temperature impact data, and the elevated temperature impact data was recorded and processed using the data acquisition computer subsystem 143 (see FIGS. 5A-5B). The rectangular heating element 112a was then turned off to allow the temperatures of the environmental chamber 102 and the plurality of the NDI sensors 130 to return to room temperature or ambient temperature.

On completion of the elevated temperature evaluation, and once the temperatures of the environmental chamber 102 and the plurality of NDI sensors 130 were stabilized at room temperature or ambient temperature, the liquid nitrogen tank 120a (see FIGS. 5A-5B) was opened to allow liquid nitrogen to flow through the cooling source connector element 122 (see FIGS. 5A-5B) and into the environmental chamber 102 (see FIGS. 5A-5B) via the cooling coil 116a (see FIGS. 5A-5B). The temperatures of the environmental chamber 102 and the plurality of the NDI sensors 130 were raised to a required freezing temperature by cooling the cooling coil 116a to a freezing temperature of −78° F. (minus seventy-eight degrees Fahrenheit) and lower. At the freezing temperature, the structure 126 with the plurality of NDI sensors 130 was again impacted with the impact testing assembly 136. The plurality of NDI sensors 130 collected the freezing temperature impact data, and the freezing temperature impact data was recorded and processed using the data acquisition computer subsystem 143 (see FIGS. 5A-5B). The liquid nitrogen tank 120a (see FIGS. 5A-5B) was then closed to stop the flow of liquid nitrogen to the environmental chamber 102 (see FIGS. 5A-5B) via the cooling coil 116a (see FIGS. 5A-5B). The temperatures of the environmental chamber 102 and the plurality of NDI sensors 130 then warmed up and returned to room temperature or ambient temperature.

For the sensor evaluation tests performed, the structure 126 with the plurality of NDI sensors 130 under test was impacted at various impact target energy levels in an impact target energy level range of from 300 in-lb (inch-pounds) to 1700 in-lb. The measurement of each impact was measured by the lamb wave or mechanical sound width of the vibration produced by the impact. The impacted NDI sensors received and triangulated a series of lamb waves or mechanical sound widths propagated by the vibration through the structure 126 under test when the structure 126 was impacted. The NDI sensors transmitted the lamb waves or the mechanical sound widths to the data acquisition computer subsystem 143 (see FIGS. 5A-5B). The data acquisition computer subsystem 143 collected and processed the lamb waves or mechanical sound widths in order to display images of impact defects within the structure 126 under test.

The images of the NDI sensor detected impact damage were in the form of amplitude/color intensities, measured with a color scale, and were displayed with the data acquisition computer subsystem 143 (see FIGS. 5A-5B). The data acquisition computer subsystem 143 had a built in algorithm that converted the data into plotted images, such as shown in the plots of FIGS. 7-11, showing the impact damage, its severity, size and location. The depth of the damage was measured using a depth gage. After the images were determined, an evaluation of the size and location of the sensor detected impact damage was performed using the built algorithm described above. Analytical models may be built using Finite Element Analysis (FEA), to try to evaluate the performance and functionality of the plurality of NDI sensors 130 based on detected impact damage at varying temperature conditions and at varying impact target energy levels. The FEA result of the models may be validated with experimental tests.

Figure 9:
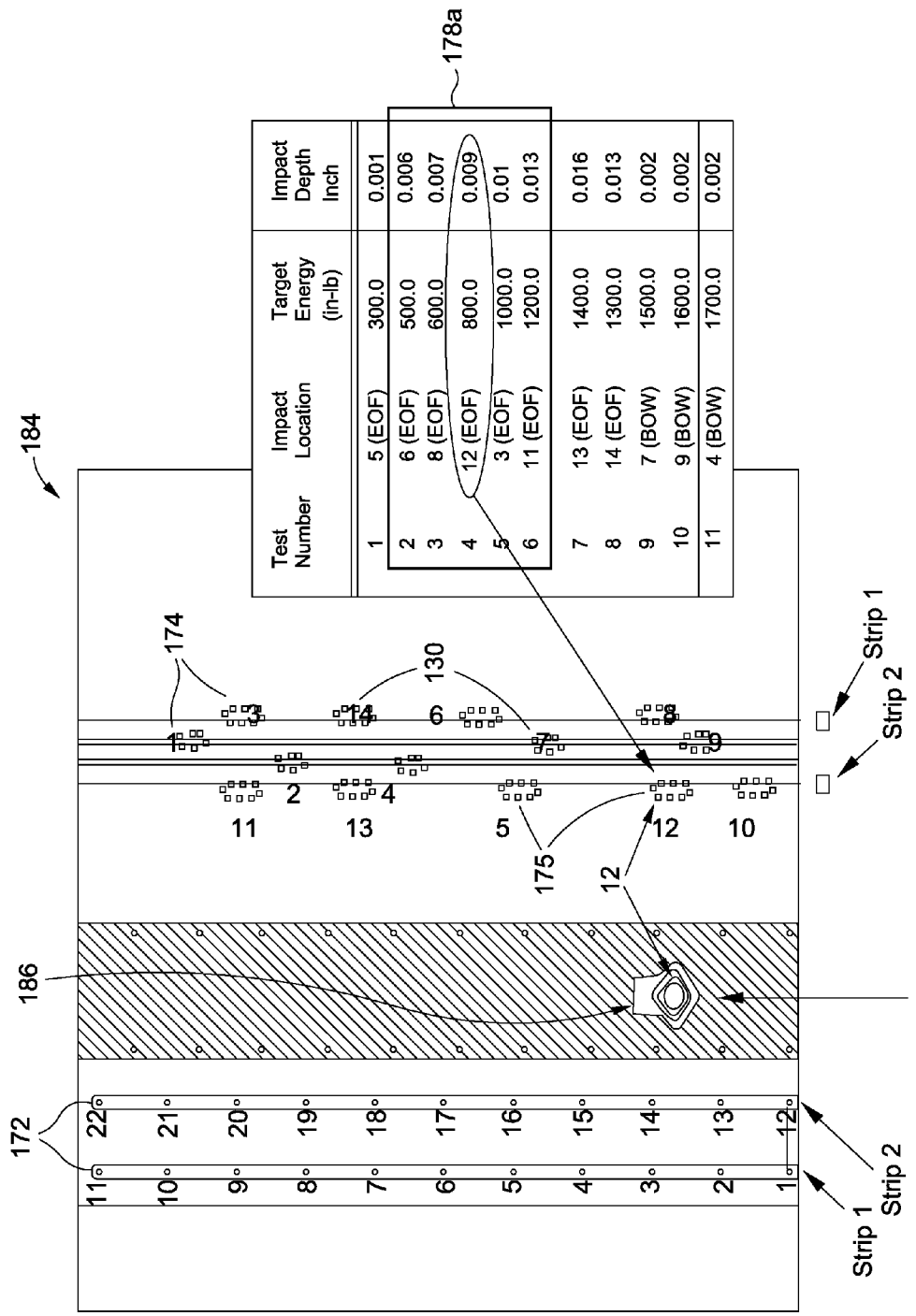
FIG. 9 is an illustration of a plot of test results of NDI sensor output at an NDI sensor location number 12.
Figure 10:
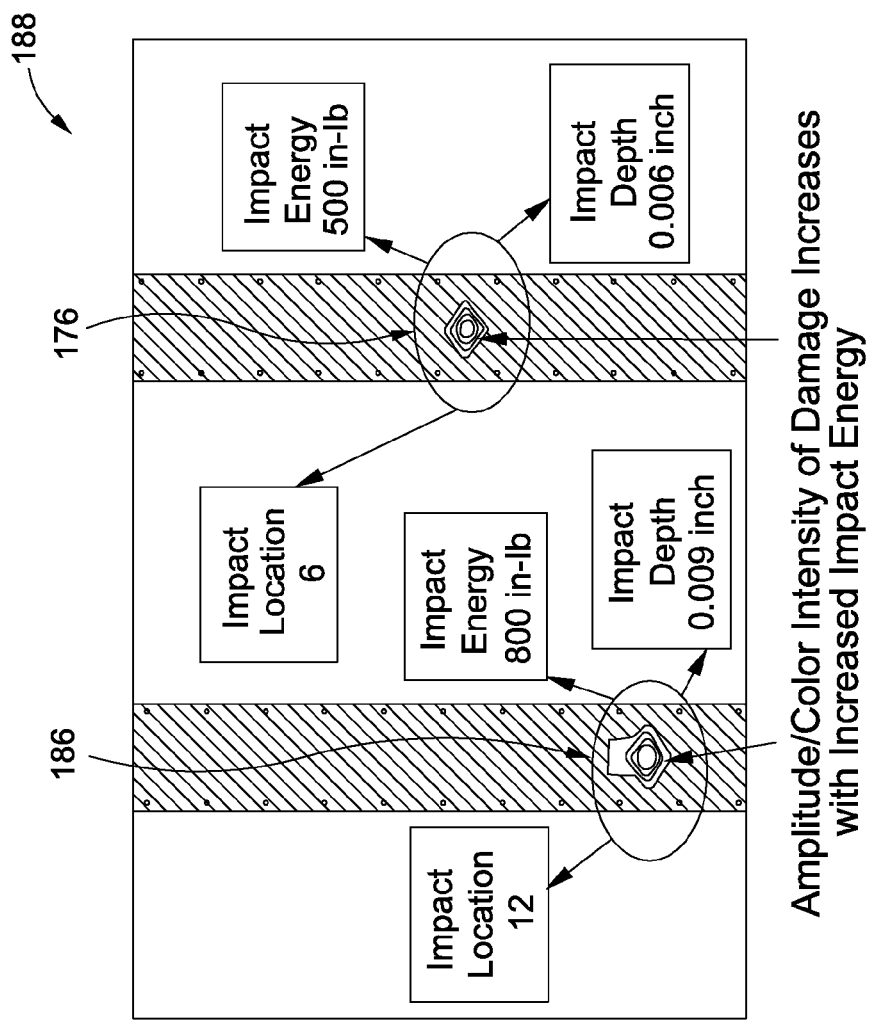
FIG. 10 is an illustration of a plot comparing impact damage of an impact location number 12 versus an impact location number 6; and, FIG. 11 is an illustration of a plot comparing impact damage from multiple impacts versus impact damage at an impact target energy of 1000 in-lb (inch-pounds), as detected by NDI sensor response at different temperatures.
Figure 11:
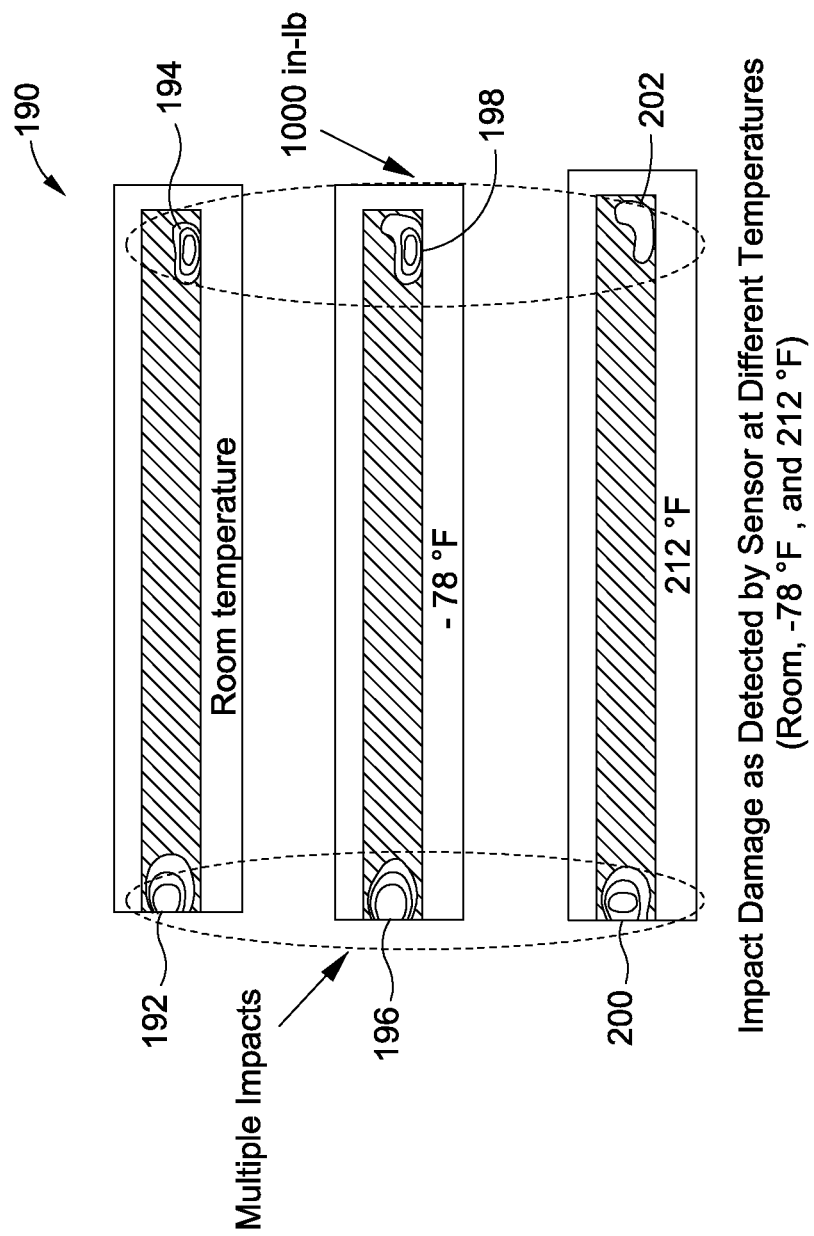

FIGS. 7-11 show the test results of the various NDI sensor evaluation tests. FIGS. 7-10 show the test results of NDI sensor detected impacts at different impact target energy levels and at different NDI sensor locations. FIG. 11 shows the test results of NDI sensor detected impacts at different temperatures with multiple impacts and impact at 1000 in-lb. FIGS. 7-11 show various NDI sensor detected impact location images of impact damage amplitude/color intensity.

Example 1

Figure 7:
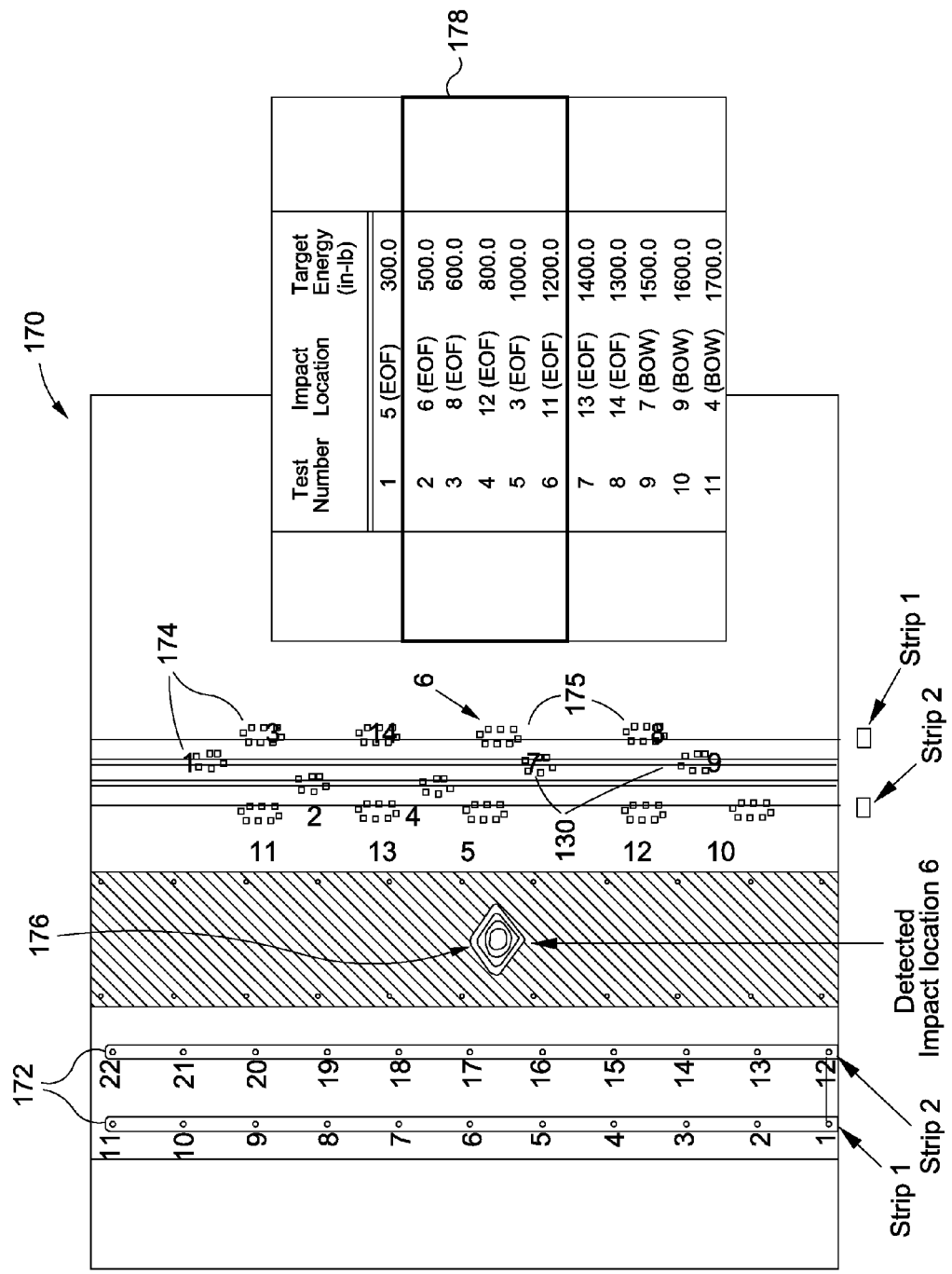
FIG. 7 is an illustration of a plot of test results of NDI sensor output at an NDI sensor location number 6.

FIG. 7 is an illustration of a plot 170 of test results 178 of NDI sensor output at an NDI sensor location number 6. As shown on the left side of FIG. 7, NDI sensor location numbers 1-22 were mounted and were divided between two rows indicated as Strip 1 and Strip 2, and NDI sensor location numbers 1-11 were on Strip 1, and NDI sensor location numbers 12-22 were on Strip 2. Plot portion 172 shows a top surface of Strip 1 and Strip 2 and does not show the NDI sensors 130 which are below the top surface. Plot portion 174 shows a view of the NDI sensors 130 below the top surface of the same Strip 1 and Strip 2 as shown on the left side of FIG. 7. The impact locations 175 are shown below the top surface of Strip 1 and Strip 2. An impact damage amplitude/color intensity indicated by an NDI sensor detected impact location image 176 is shown for NDI sensor location number 6 and shows the impact damage amplitude/color intensity, which was measured using a color scale. The more intense the color that was visible, the greater the impact damage. As shown in FIG. 7, the test results 178 show the test number, the impact location, and the impact target energy. The test number was the number of the test being measured. The impact location 175 was the location where an NDI sensor was impacted. For example, as shown in FIG. 7, NDI sensors 5, 6, 8, 12, 3, 11, 13 and 14 were impacted at the "EOF" or "end of flange" location, which is a location at the end of the bonded joint, which was the structure 126 under test. As further shown in FIG. 7, NDI sensors 9, 10, and 11 were impacted at the "BOW" or "base of web" location, which is a location on the bonded joint. The impact target energy used to impact the structure 126 was measured in inch-pounds (in-lb). The impact target energy used to impact the structure 126 at NDI sensor location number 6 was 500 in-lb. This test was conducted to see if the plurality of NDI sensors 130 would detect impact damage and receive lamb waves or mechanical sound widths when the structure 126 was impacted at a lower impact target energy (e.g., 500 in-lb). It was found that the plurality of NDI sensors 130 did detect impact damage and did receive lamb waves or mechanical sound waves widths when the structure 126 was impacted at an impact target energy of 500 in-lb.

Example 2

Figure 8:
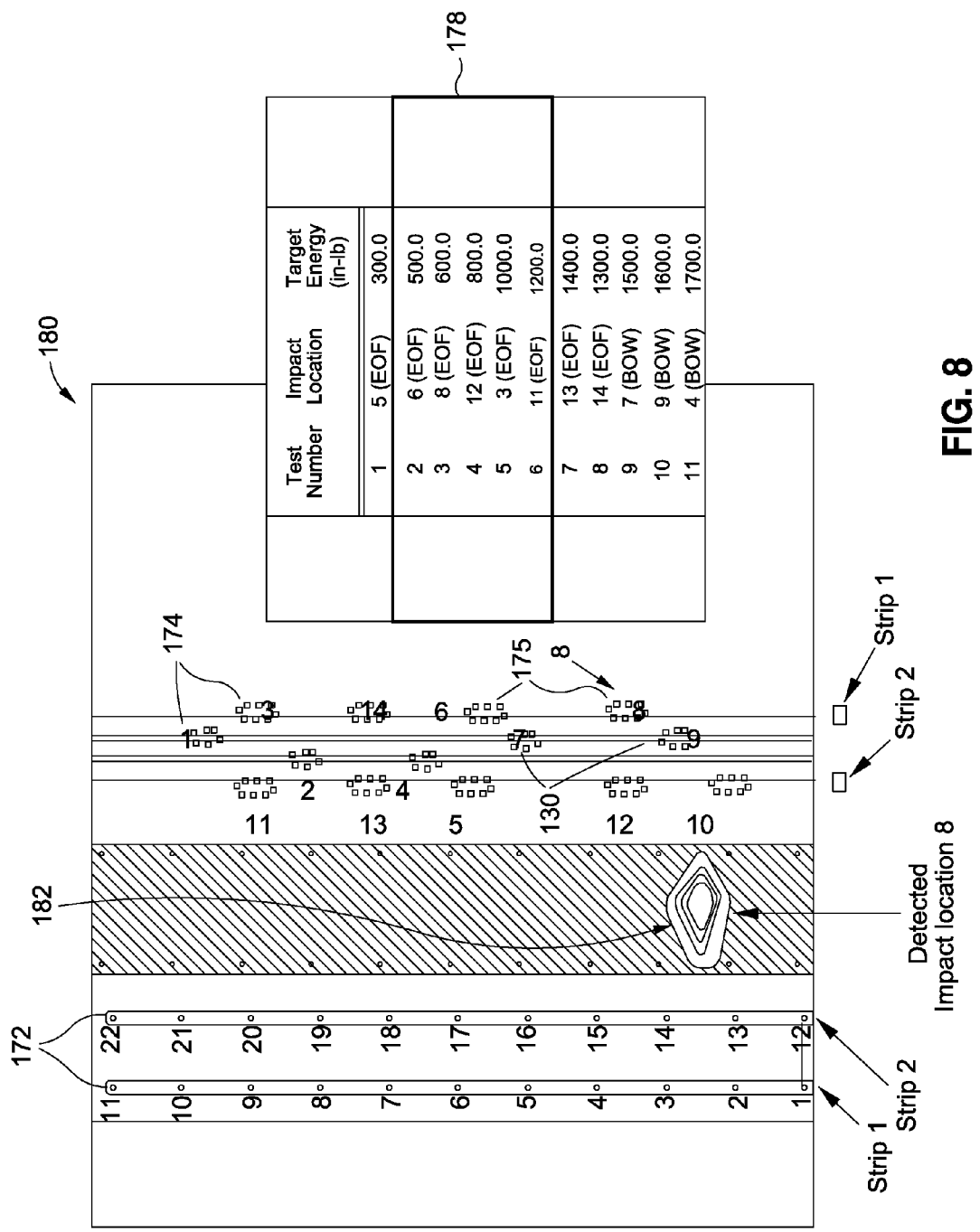
FIG. 8 is an illustration of a plot of test results of NDI sensor output at an NDI sensor location number 8.

FIG. 8 is an illustration of a plot 180 of test results 178 of NDI sensor output at an NDI sensor location number 8. As shown on the left side of FIG. 8, NDI sensor location numbers 1-22 were divided between two rows indicated as Strip 1 and Strip 2, and NDI sensor location numbers 1-11 were on Strip 1, and NDI sensor location numbers 12-22 were on Strip 2. Plot portion 172 shows a top surface of Strip 1 and Strip 2 and does not show the NDI sensors 130 which are below the top surface. Plot portion 174 shows a view of the NDI sensors 130 below the top surface of the same Strip 1 and Strip 2 as shown on the left side of FIG. 8. The impact locations 175 are shown below the top surface of Strip 1 and Strip 2. An impact damage amplitude/color intensity indicated by an NDI sensor detected impact location image 182 is shown for NDI sensor location number 8 and shows the impact damage amplitude/color intensity, which was measured using a color scale. As shown in FIG. 8, the test results 178 show the test number, the impact location, and the impact target energy. The test number was the number of the test being measured. The impact location 175 was the location where an NDI sensor was impacted. As shown in FIG. 8, NDI sensors 5, 6, 8, 12, 3, 11, 13 and 14 were impacted at the EOF (end of flange) location, and NDI sensors 9, 10, and 11 were impacted at the BOW (base of web) location. The impact target energy used to impact the structure 126 (see FIGS. 5A-5B) was measured in inch-pounds (in-lb). The impact target energy used to impact NDI sensor location number 8 was 600 in-lb. This test was conducted to see what the effect would be of varying the impact on the structure 126 (see FIGS. 5A-5B) under test by increasing the impact target energy to 600 in-lb. It was found that the plurality of NDI sensors 130 received lamb waves or mechanical sound waves widths when the structure 126 was impacted at an increased impact target energy of 600 in-lb. In addition, the sensors were also able to distinguish between the impact energy levels, for example, the higher the impact energy level, the higher the intensity of the color of the damage plotted.

Example 3

FIG. 9 is an illustration of a plot 184 of test results 178a of NDI sensor output at an NDI sensor location number 12. As shown on the left side of FIG. 9, NDI sensor location numbers 1-22 were divided between two rows indicated as Strip 1 and Strip 2, and NDI sensor location numbers 1-11 were on Strip 1, and NDI sensor location numbers 12-22 were on Strip 2. Plot portion 172 shows a top surface of Strip 1 and Strip 2 and does not show the NDI sensors 130 which are below the top surface. Plot portion 174 shows a view of the NDI sensors 130 below the top surface of the same Strip 1 and Strip 2 as shown on the left side of FIG. 9. The impact locations 175 are shown below the top surface of Strip 1 and Strip 2. An impact damage amplitude/color intensity indicated by an NDI sensor detected impact location image 186 is shown for NDI sensor location number 12, which was measured using a color scale. The NDI sensor detected impact location image 186 also shows the ability of the NDI sensor to display the "BVID" or "barely visible impact damage" impact range, which means that the structure 126 was impacted, and even though no external damage was visible to the human eye, there was internal damage below the top surface that was not visible. As shown in FIG. 9, the test results 178a show the test number, the impact location, the impact target energy, and the impact depth. The test number was the number of the test being measured. The impact location 175 was the location where an NDI sensor was impacted. As shown in FIG. 9, NDI sensors 5, 6, 8, 12, 3, 11, 13 and 14 were impacted at the EOF (Edge of Flange) location, and NDI sensors 9, 10, and 11 were impacted at the BOW (Base of Web) location. The impact target energy used to impact the structure 126 was measured in inch-pounds (in-lb). The impact target energy used to impact NDI sensor location number 12 was 800 in-lb. The impact depth was measured in inches, and the impact depth of the impact NDI sensor location number 12 was 0.009 inch. This test was conducted to see what the effect would be of varying the impact on the structure 126 (see FIGS. 5A-5B) under test by increasing the impact target energy to 800 in-lb. It was found that the plurality of NDI sensors 130 received lamb waves or mechanical sound waves when the structure 126 was impacted at an impact target energy of 800 in-lb. It was further found that the impact damage amplitude/color intensity indicated by the NDI sensor detected impact location image 186 was greater in Example 3 than in Examples 1 and 2. The structure 126 was impacted at a higher target energy and had a greater impact damage amplitude/color intensity and a greater impact depth than in Examples 1 and 2.

FIG. 10 is an illustration of a plot 188 comparing impact damage of impact location number 12 versus impact location number 6, including a comparison of impact target energy, impact depth, and impact damage amplitude/color intensity between NDI sensor location number 12 and NDI sensor location number 6. FIG. 10 shows the impact damage amplitude/color intensity indicated by the NDI sensor detected impact location image 186 of the impact location for NDI sensor location number 12, as compared to the impact damage amplitude/color intensity of the NDI sensor detected impact location image 176 of the impact location for NDI sensor location number 6. FIG. 10 indicates the impact target energy of 800 in-lb (inch-pounds) and the impact depth of 0.009 inch for the impact location for NDI sensor location number 12. FIG. 10 indicates the impact target energy of 500 in-lb and the impact depth of 0.006 inch for the impact location for NDI sensor location number 6. As measured using a color scale, the impact damage amplitude/color intensity indicated by the NDI sensor detected impact location image 186 at the impact location for NDI sensor location number 12 having an impact target energy of 800 in-lb, was greater in intensity than the impact damage amplitude/color intensity indicated by the NDI sensor detected impact location image 176 of the impact location for NDI sensor location number 6 having an impact target energy of 500 in-lb. This comparison showed that the impact damage amplitude/color intensity increased with an increased impact target energy.

Example 4

FIG. 11 is an illustration of a plot 190 comparing impact damage from multiple impacts versus impact damage at an impact target energy of 1000 in-lb (inch-pounds), as detected by NDI sensor response at different temperatures. Multiple impacts to the structure 126 (see FIGS. 5A-5B) with the plurality of NDI sensors 130 (see FIGS. 5A-5B) under test were made at room temperature, at a freezing temperature of −78° F. (minus seventy-eight degrees Fahrenheit), and at an elevated temperature of 212° F. (two hundred twelve degrees Fahrenheit). Impacts at an impact target energy of 1000 in-lb were made to the structure 126 with the plurality of NDI sensors 130 (see FIGS. 5A-5B) under test at room temperature, at a freezing temperature of −78° F. (minus seventy-eight degrees Fahrenheit), and at an elevated temperature of 212° F. (two hundred twelve degrees Fahrenheit). FIG. 11 shows the comparison of impact damage amplitude/color intensity indicated by NDI sensor detected impact location image 192 at multiple impacts made at room temperature versus the impact damage amplitude/color intensity indicated by NDI sensor detected impact location image 194 at 1000 in-lb impact made at room temperature. At room temperature, it was found that the NDI sensors were working and detected impact damage both at multiple impacts and at the 1000 in-lb impact. FIG. 11 shows the comparison of impact damage amplitude/color intensity indicated by NDI sensor detected impact location image 196 at multiple impacts made at a freezing temperature of −78° F. versus the impact damage amplitude/color intensity indicated by NDI sensor detected impact location image 198 at 1000 in-lb impact made at a freezing temperature of −78° F. At the freezing temperature of −78° F., it was found that the NDI sensors were working and detected impact damage both at multiple impacts and at the 1000 in-lb impact. FIG. 11 shows the comparison of impact damage amplitude/color intensity indicated by NDI sensor detected impact location image 200 at multiple impacts made at an elevated temperature of 212° F. versus the impact damage amplitude/color intensity indicated by NDI sensor detected impact location image 202 at the 1000 in-lb impact made at an elevated temperature of 212° F. At the elevated temperature of 212° F., it was found that the NDI sensors were working and detected impact damage at multiple impacts. However, it was found that the NDI sensors detected minimal impact damage at the 1000 in-lb impact, and it was concluded that the NDI sensors malfunctioned or prematurely failed at the elevated temperature of 212° F. with the 1000 in-lb impact. Based on this test result, it was concluded that both the type of material used for the NDI sensors, as well as the bonding agent material used to bond the NDI sensors to the structure 126 (see FIGS. 5A-5B), needed to be evaluated and changed to a material or materials capable of maintaining a bond and surviving at the elevated temperature of 212° F. or higher.

As will be appreciated by those of skill in the art, embodiments of the disclosed method 70 and system 100 for environmental testing and evaluation of non-destructive inspection (NDI) sensors 130 (see FIGS. 5A-5B), such as smart NDI sensors, provide a number of substantial benefits. Disclosed embodiments of the method 70 (see FIG. 4) and system 100 (see FIGS. 5A-5B) allow for the testing and evaluation of the suitability and performance of NDI sensors 130, such as smart NDI sensors, for use in different environmental conditions, including at room temperature or ambient temperature, at elevated temperatures such as at the elevated temperature of 212° F. or higher, and at freezing temperatures such as at the freezing temperature of −78° F. or lower. Such testing and evaluation may eliminate premature failure of the NDI sensors, such as smart NDI sensors, in adverse environmental and temperature conditions when in use, and may ensure accurate performance of the NDI sensors, such as smart NDI sensors, under these conditions. This, in turn, may have the advantages of avoiding or decreasing labor and rework costs and out-of-service time of an aircraft, or other vehicle or structure, due to the time and expense of having to remove and replace defective sensors. Thus, disclosed embodiments of the method 70 (see FIG. 4) and system 100 may ensure that the tested and evaluated NDI sensors, such as smart NDI sensors, survive and perform accurately when subjected to adverse environmental conditions and/or varying temperature conditions.

In addition, disclosed embodiments of the method 70 (see FIG. 4) and system 100 (see FIGS. 5A-5B) may be used for non-destructive inspection (NDI) and structural health monitoring of aircraft or other vehicles or structures in the evaluation of NDI sensor performance at varying required temperatures and also for certification purposes. The disclosed embodiments of the method 70 (see FIG. 4) and system 100 (see FIGS. 5A-5B) may be used to accurately detect with the NDI sensors, such as the smart NDI sensors, the depth and location of any internal damage to a structure that may occur as a result of external impact to the structure without having to disassemble the structure. This may have the advantages of avoiding or decreasing labor and rework costs and out-of-service time of an aircraft, or other vehicle or structure, due to the time and expense of having to disassemble the structure in order to confirm the depth and location of any such internal damage. Moreover, if such NDI and structural health monitoring occurs during the manufacturing process, the detection and evaluation of defects during the manufacturing process may significantly reduce the cost of component manufacture, as defects can be found early in the manufacturing process, and may reduce the number of additional manufacturing processes being performed on the unfinished component.

Further, disclosed embodiments of the method 70 (see FIG. 4) and system 100 (see FIGS. 5A-5B) may be used to help determine the most advantageous locations for NDI sensor placement on a structure, that is, where the NDI sensors may be most effective with the least possibility of damage. This may have the advantages of avoiding or decreasing labor and rework costs and out-of-service time of an aircraft, or other vehicle or structure, due to the time and expense of having to remove and replace NDI sensors that may be damaged due to their placement and location on a structure.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A system for environmental testing and evaluation of non-destructive inspection (NDI) sensors, the system comprising:
    a structure having a plurality of non-destructive inspection (NDI) sensors to be tested;
    an environmental chamber containing one or more heating elements and one or more cooling elements configured for heating and cooling the NDI sensors when the structure is secured to the environmental chamber;
    an impact testing assembly positioned over the structure and configured for impacting the structure; and,
    a data acquisition computer subsystem coupled to the environmental chamber and coupled to the NDI sensors, the data acquisition computer subsystem configured to:
        control and monitor the one or more heating elements and the one or more cooling elements, and
        collect and process temperature and impact data acquired by the NDI sensors to obtain a temperature profile for the structure, to determine one or more installation locations for the NDI sensors on the structure, and to detect a depth and a location of any internal damage to the structure resulting from impact to the structure.

2. The system of claim 1 further comprising an adjustable leveling device attached to the environmental chamber.

3. The system of claim 1 wherein the non-destructive inspection (NDI) sensors are mounted on, or embedded within, the structure.

4. The system of claim 1 wherein the non-destructive inspection (NDI) sensors comprise piezoelectric sensors, piezoelectric sensors and actuators embedded on a dielectric carrier film, fiber-powered active sensors, accelerometer-based sensors, nanosensors, NDI sensors integrated with radio frequency identification (RFID) tags, active sensor nodes, active sensor fibers, active sensor wires, sensor fiber optic wires, sensor coatings on fibers, carbon nanotubes, passive sensors, electrode sensors, pulse-echo (PE) sensors, pitch-catch active sensors, through transmission (TT) sensors, shear wave sensors, resonance sensors, mechanical impedance sensors, lamb wave sensors, rayleigh wave sensors, stoneley wave sensors, or a combination thereof.

5. The system of claim 1 wherein the non-destructive inspection (NDI) sensors are capable of operating at a temperature of 212° F. (two hundred twelve degrees Fahrenheit) or higher, and are capable of operating at a temperature of −78° F. (minus seventy-eight degrees Fahrenheit) or lower.

6. The system of claim 1 wherein the structure comprises an aircraft structure made of a composite material, a metal material, or a combination thereof.

7. The system of claim 1 wherein the one or more cooling elements are connected to a cooling source external to the environmental chamber, the cooling source coupled to the data acquisition computer subsystem.

8. The system of claim 1 wherein the impact testing assembly comprises an impacting device and an impactor element, the impactor element configured for impacting an impact side of the structure.

9. The system of claim 1 wherein the data acquisition computer subsystem comprises a sensor processing and monitoring assembly coupled to the non-destructive inspection (NDI) sensors, the sensor processing and monitoring assembly comprising a sensor processing computer and a sensor monitoring unit.

10. The system of claim 1 wherein the data acquisition subsystem comprises a data collection and controller assembly coupled to the one or more heating elements and coupled to the one or more cooling elements, the data collection and controller assembly comprising a data collection and monitoring computer and a controller device.

11. The system of claim 1 wherein the data acquisition computer subsystem is wireless.

12. A computer-enabled system for environmental testing and evaluation of non-destructive inspection (NDI) sensors on an aircraft structure, the system comprising:
 an aircraft structure having a plurality of non-destructive inspection (NDI) sensors to be tested;
 an environmental chamber containing one or more heating elements and one or more cooling elements configured for heating and cooling the NDI sensors when the aircraft structure is secured to the environmental chamber;
 an impact testing assembly positioned over the aircraft structure and configured for impacting the aircraft structure; and,
 a data acquisition computer subsystem coupled to the environmental chamber and coupled to the NDI sensors, the data acquisition computer subsystem configured to:
  control and monitor the one or more heating elements and the one or more cooling elements, and
  collect and process temperature and impact data acquired by the NDI sensors to obtain a temperature profile for the aircraft structure, to determine one or more installation locations for the NDI sensors on the aircraft structure, and to detect a depth and a location of any internal damage to the aircraft structure resulting from impact to the aircraft structure.

13. The system of claim 12 wherein the non-destructive inspection (NDI) sensors are mounted on, or embedded within, the aircraft structure.

14. The system of claim 12 wherein the non-destructive inspection (NDI) sensors are capable of operating at a temperature of 212° F. (two hundred twelve degrees Fahrenheit) or higher, and are capable of operating at a temperature of −78° F. (minus seventy-eight degrees Fahrenheit) or lower.

15. A method for environmental testing and evaluation of non-destructive inspection (NDI) sensors, the method comprising the steps of:
 performing a room temperature evaluation with an impact testing assembly impacting a structure under test, the structure having a plurality of non-destructive inspection (NDI) sensors, the NDI sensors collecting room temperature impact data;
 performing an elevated temperature evaluation with the impact testing assembly impacting the structure under test, the NDI sensors collecting elevated temperature impact data;
 performing a freezing temperature evaluation with the impact testing assembly impacting the structure under test, the NDI sensors collecting freezing temperature impact data;
 repeating the steps of performing the room temperature evaluation, performing the elevated temperature evaluation, and performing the freezing temperature evaluation, the repeated steps performed at varying temperature levels, at varying impact energy levels, and at multiple sensor locations;
 obtaining a temperature profile for the structure under test by using a data acquisition computer subsystem;
 displaying impact testing results with the data acquisition computer subsystem; and,
 determining, based on the impact testing results, one or more installation locations for the NDI sensors on the structure.

16. The method of claim 15 further comprising the step of detecting, without having to disassemble the structure, a depth and a location of any internal damage to the structure resulting from impacting the structure.

17. The method of claim 16 wherein the step of detecting comprises the NDI sensors receiving and triangulating lamb waves transmitted through the structure from impact of the structure, and calculating and evaluating the lamb waves with the data acquisition computer subsystem to determine the depth and the location of any internal damage to the structure.

18. The method of claim 15 further comprising the step of positioning the non-destructive inspection (NDI) sensors within, or adjacent to, the structure.

19. The method of claim 15 wherein the step of performing the elevated temperature evaluation comprises testing the non-destructive inspection (NDI) sensors for operation at a temperature of 212° F. (two hundred twelve degrees Fahrenheit) or higher.

20. The method of claim 15 wherein the step of performing the freezing temperature evaluation comprises testing the non-destructive inspection (NDI) sensors for operation at a temperature of −78° F. (minus seventy-eight degrees Fahrenheit) or lower.

* * * * *